(12) United States Patent
Watanabe

(10) Patent No.: US 7,120,101 B2
(45) Date of Patent: Oct. 10, 2006

(54) HEAD FOLLOW-UP CONTROL METHOD, HEAD FOLLOW-UP CONTROL DEVICE AND STORAGE DEVICE THEREOF

(75) Inventor: Ichiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 10/756,204

(22) Filed: Jan. 13, 2004

(65) Prior Publication Data

US 2004/0196768 A1    Oct. 7, 2004

Related U.S. Application Data

(63) Continuation of application No. PCT/JP01/06187, filed on Jul. 17, 2001.

(51) Int. Cl.
  *G11B 7/09* (2006.01)
  *G11B 7/095* (2006.01)
(52) U.S. Cl. .............................. 369/53.28; 369/53.14; 369/53.23
(58) Field of Classification Search ............... None
  See application file for complete search history.

(56) References Cited

U.S. PATENT DOCUMENTS 4,616,276 A * 10/1986 Workman ................ 360/77.04
4,747,089 A *  5/1988 Eguchi et al. ............ 369/44.34

FOREIGN PATENT DOCUMENTS

| JP | 62-18683 | 1/1987 |
|---|---|---|
| JP | 5-274826 | 10/1993 |
| JP | 6-084306 | 3/1994 |
| JP | 6-267211 | 9/1994 |
| JP | 7-098948 | 4/1995 |
| JP | 10-021571 | 1/1998 |
| JP | 11-039814 | 2/1999 |
| JP | 11-232810 | 8/1999 |
| JP | 2000-311454 | 11/2000 |
| JP | 2000-339729 | 12/2000 |

OTHER PUBLICATIONS

Kempf et al.; "Comparison of Four Discrete-Time Repetitive Control Algorithms"; IEEE Control Systems; pp. 48-54; 1993.
Dote et al.; "Modern Control Series 4 'Motion Control'"; pp. 131-139; Corona Ltd.

* cited by examiner

*Primary Examiner*—Brian E. Miller
*Assistant Examiner*—Peter Vincent Agustin
(74) *Attorney, Agent, or Firm*—Greer, Burns & Crain, Ltd.

(57) ABSTRACT

A follow-up control system follows up a head of a storage device to a storage medium. A sine wave signal learning section (82) which learns sine wave signals according to follow-up error signals which are input to a feedback control system (80), and performs time lead compensation corresponding to a delay of the feedback system (80), is provided. Since the time lead compensation is used for the sine wave signal learning model which can learn at high-speed, frequency disturbance of high frequency, for which phase lag must be considered, can be a compensation target, and the present invention contributes to the improvement of follow-up accuracy of the storage device.

24 Claims, 25 Drawing Sheets

FIG. 7
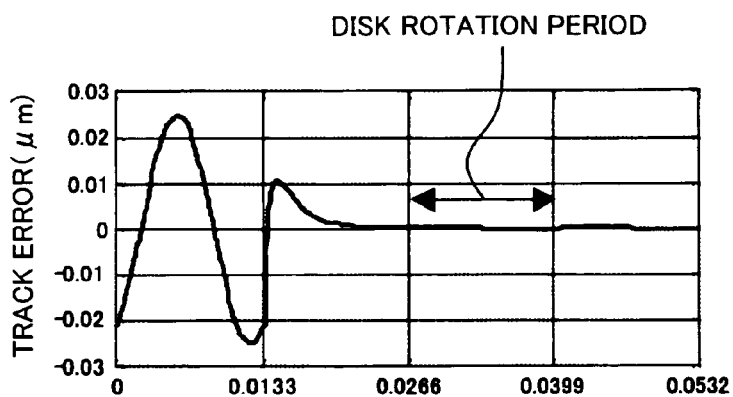
FIG. 8
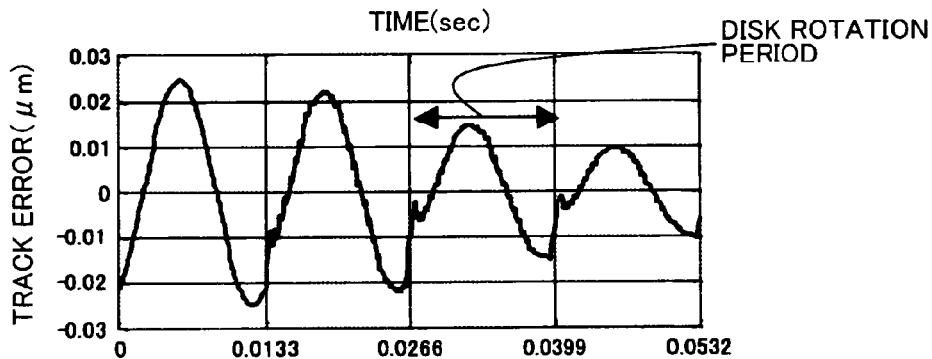
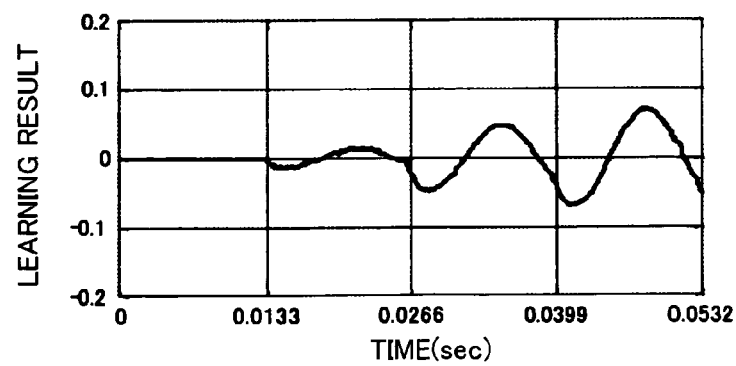

FIG. 25
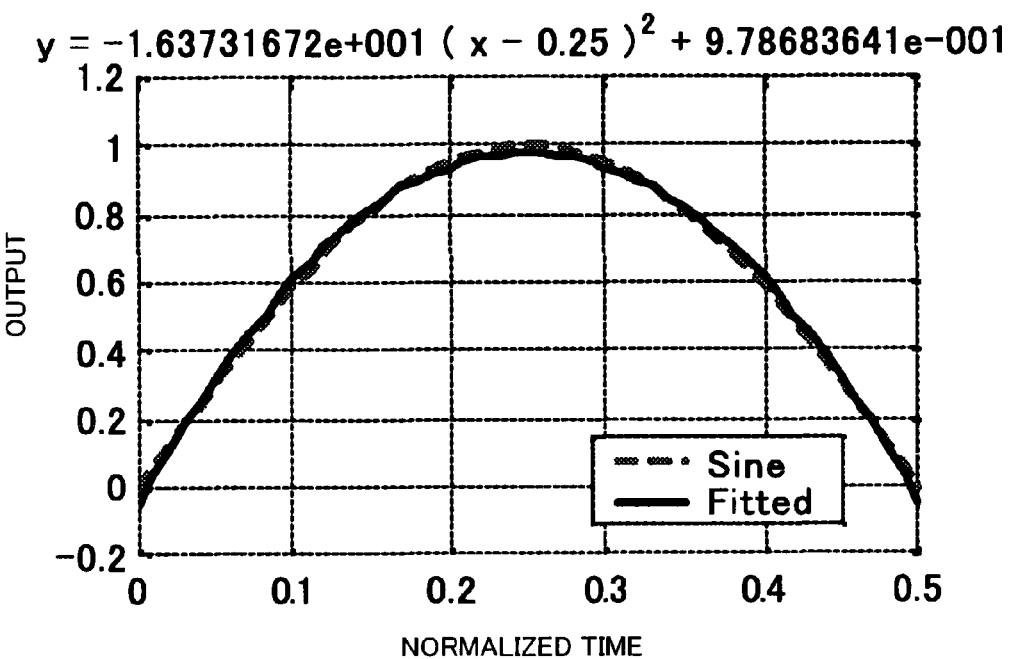
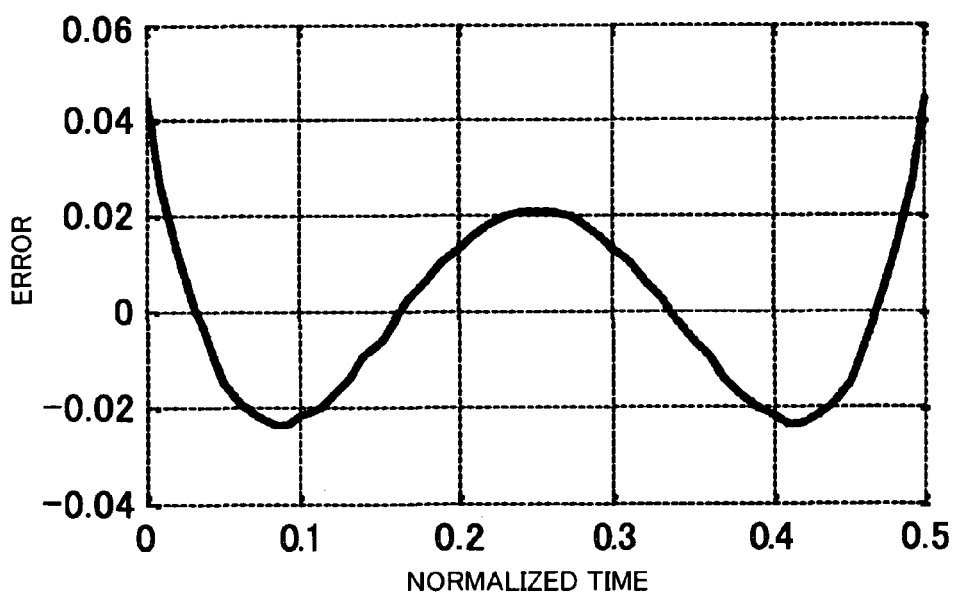

HEAD FOLLOW-UP CONTROL METHOD, HEAD FOLLOW-UP CONTROL DEVICE AND STORAGE DEVICE THEREOF

This application is a continuation of international application PCT/JP01/06187, filed on Jul. 17, 2001.

TECHNICAL FIELD

The present invention relates to a head follow-up control method, head follow-up control device and storage device, for causing the head such as an optical beam head to follow up a storage medium in a storage device using a storage medium such as a disk, and more particularly to a head follow-up control method, head follow-up control device and storage device for adaptively learning a specific frequency disturbance which becomes a problem in improving follow-up accuracy, and compensating the frequency disturbance.

BACKGROUND ART

Increasing the storage capacity of a storage device using such a storage medium as an optical disk and magnetic disk is demanded, and for this, the recording density, particularly the track density of the storage medium is increasing remarkably. In such a storage device, the head for reading and/or writing the storage medium must follow up the storage medium at high precision. In an optical disk, for example, focus and track control of the optical beam to the optical disk are required. And to increase the accuracy of the follow-up control system, a disturbance near one or a plurality of specific frequencies deteriorates the follow-up accuracy conspicuously, so a control system for suppressing this effectively is demanded.

For example, in the track follow-up control of an optical disk, the disturbance of a specific frequency may have a dominant negative effect on the track follow-up accuracy. Generally there is a disturbance synchronizing with the rotation of the optical disk, and a disturbance not synchronizing with the rotation. The most conspicuous disturbance synchronizing with rotation is a disturbance due to rotation frequency and an integral multiple of the rotation frequency caused by eccentricity.

It has been shown that such a disturbance can be efficiently compensated by a learning control system synchronizing rotation (e.g. Japanese Patent Application Laid-Open No. 2000-339729, U.S. Pat. No. 4,616,276, and the publication "Modern Control Series 4, 'Motion Control', (by Dote and Harashima), published by Corona Ltd.").

In other words, in these learning controls, a low frequency disturbance can be easily compensated when the disturbance frequency is low frequency (e.g. rotation frequency).

For example, the disturbance removal method by learning disclosed in U.S. Pat. No. 4,616,276 and the publication "Modern Control Series 4, 'Motion Control' (by Dote and Harashima), published by Corona Ltd." will be described with reference to FIG. 27 and FIG. 28.

This disturbance removal method is to express the model of a signal (unknown) for compensating frequency disturbance to be a problem by a composite representation of sin and cos, and to adaptively identify the amplitude gain of the respective component of the signal sequentially, thereby sequentially identifying the amplitude and phase of the target frequency disturbance and compensating the target frequency disturbance by feed-forwarding the identification result.

This will be described in detail with reference to FIGS. 27(A) and 27(B). When the target is a specific frequency disturbance, the model representing the control signal for compensating disturbance which has the frequency fd [Hz] (hereafter called disturbance compensation signal) is represented with the amplitude A and the phase $\phi$ as the following formula (1).

$$Dfd = A \times \sin(2 \times \pi \times fd \times t + \phi) \tag{1}$$

Also the formula (1) is expanded to the formula (2) by a composite formula of trigonometric functions.

$$\begin{aligned} Dfd &= A \times \sin(2 \times \pi \times fd \times t + \phi) \\ &= a \times \sin(2 \times \pi \times fd \times t) + \\ &\quad b \times \cos(2 \times \pi \times fd \times t) \end{aligned} \tag{2}$$

Here $A = (a^2 + b^2), \phi = \tan^{-1}(b/a)$

In this way, the control signal is represented by the weighted sum of the sine and cosine functions removing the phase $\phi$. In other words, an arbitrary disturbance compensation signal having the frequency fd [Hz] (that is a disturbance compensation signal having the frequency fd [Hz] which has an arbitrary amplitude A and an arbitrary initial phase $\phi$) can be represented by determining the amplitudes a and b for the sine and cosine functions in formula (2) respectively.

Here the values a and b are obtained on line by a learning rule (also called an adaptive-rule). FIG. 27(A) is a diagram depicting the sine wave signal learning section 100 which learns the amplitude and the phase of an arbitrary sine wave signal having the frequency fd which was input to Xref, and outputs the signal Y where the learned amplitude and phase are copied.

The error e indicates the error between the input signal Xref and the signal Y which was copied by the learning section 100. The sine wave signal learning section 100 updates the values a and b sequentially by inputting the error e, and outputs the latest sine wave signal generation result Y. The values a and b are sequentially updated according to the following learning rule by the formula (3).

$$a(t) = k \times \sin(2 \times \pi \times fd \times t) \times e(t)$$

$$b(t) = k \times \cos(2 \times \pi \times fd \times t) \times e(t) \tag{3}$$

And the latest sine wave signal generation result Y is sequentially output by the following formula (4).

$$Y(t) = a(t) \times \sin(2 \times \pi \times fd \times t) + b(t) \times \cos(2 \times \pi \times fd \times t) \tag{4}$$

As learning progresses and Y(t) becomes equal to Xref (t), the error e(t) becomes "0", the rate of change of the values a and b represented by the formula (3) become zero respectively, and learning converges. The sine wave signal learning section 100 described above has the function to extract sine wave signals, which have a preset specific frequency, out of the input signal, and the functions to integrate and output the sine wave signals.

Therefore in the configuration in FIG. 27(A), specific frequency components which are preset are extracted from the error signals, are integrated and output, and when the error becomes "0", integration stops.

When the present principle is applied to the follow-up control system of the storage device, the sine wave signal learning section 100 is integrated into a normal control system 101, as shown in FIG. 27(B). The sine wave signal learning section 100 extracts a specific frequency component which is preset in the direction to make the error signal "0" concerning the follow-up error signal PES, and integrates and outputs it. Therefore if the sine wave signal learning section 100 is integrated into the control system in this way, the compensation signal is finally output for the specific frequency component, which is preset, after learning. In other words, the influence of the disturbance of that frequency can be removed (suppressed).

In such a prior art, the disturbance of eccentric frequency synchronizing disk rotation, which is a conspicuous frequency disturbance in the tracking control system and the focus control system of a storage disk, such as an optical disk, can be effectively suppressed.

In the case of the learning method according to the above mentioned Japanese Patent Application Laid-Open No. 2000-339729, the rotation cycle is divided into N, and N number of values corresponding to each divided area become the learning target (e.g. divided into 32, and 32 values are learned), so time for converging learning is required after the disk rotates once so that learning is performed for each value, and this learning takes time, however the removal of a disturbance can be executed by a simpler operation. In other words, if a digital processor is used, the remove of a disturbance can be implemented by fewer operation steps.

On the other hand, in the case of the learning control using sin and cos, as in U.S. Pat. No. 4,616,276, and the publication "Modern Control Series 4, 'Motion Control' (by Dote and Harashima), published by Corona Ltd.", the number of parameters to be learned is 2 per frequency (weight with respect to the sine and cosine functions), and as the learning rule in formula (4) shows, the update operation is constantly performed. While in the learning control system of the above mentioned Japanese Patent Application Laid-Open No. 2000-339729, the update operation is performed for N number of parameters only in the corresponding time block of each rotation. Therefore the former learning control using sin and cos allows faster learning than the latter learning control. For example, learning can be converged in a very short time within 1 cycle of a disk rotation. However the computing processing is complicated, so this learning control is not suitable for -processors which processing speed is slow.

Conventional learning control, as seen in Japanese Patent Application Laid-Open No. 2000-339729, on the other hand, can suitably support the suppression of frequency component synchronizing rotation which has a certain frequency or less, as shown in FIG. 28, but the learning takes time to suppress the frequency disturbance due to a high frequency which tends to fluctuate (particularly a high frequency disturbance not synchronizing rotation). In other words, in the case of the learning method of Japanese Patent Application Laid-Open-No. 2000-339729, learning takes time, particularly the learning of a high frequency disturbance which tends to fluctuate after seeking, and in the case of the learning method of U.S. Pat. No. 4,616,276 etc., high-speed learning is possible but learning does not converge so easily due to the phase lag of the control system, and it is difficult to suppress high frequency disturbance effectively.

Because of this, for disturbance not synchronizing rotation, a method for suppressing the disturbance by improving the disturbance suppression performance of the feedback control system is used. For frequency disturbance due to a frequency which is somewhat lower than the control band, a sufficient suppression performance is frequently obtained by increasing the degree of the integration compensation of the feedback controller, for example. However, if the disturbance of a specific frequency, which is close to the control band or exceeds the control band, exists conspicuously, it is extremely difficult to suppress the disturbance by a linear feedback controller.

When a desired track follow-up accuracy cannot be achieved due to such a disturbance, all that is possible is to generally investigate the generation source of the disturbance, and to decrease the amplitude of the disturbance itself by improving the design of the mechanism, for example.

DISCLOSURE OF THE INVENTION

With the foregoing in view, it is an object of the present invention to provide a head follow-up control method, head follow-up control device and storage device for learning high frequency disturbance at high-speed, suppressing the disturbance and improving follow-up accuracy.

It is another object of the present invention to provide a head follow-up control method, head follow-up control device and storage device for learning disturbance when the disturbance with a specific frequency which is close to the control band or exceeds the control band conspicuously exists, suppressing the disturbance and improving follow-up accuracy.

It is still another object of the present invention to provide a head follow-up control method, head follow-up control device and storage device for suppressing influence of the disturbance where a plurality of frequencies are conspicuous (regardless synchronizing or not synchronizing with rotation), when the disturbance has a large influence on the follow-up accuracy.

It is still another object of the present invention to provide a head follow-up control method, head follow-up control device and storage device for suppressing the influence of disturbance by a simple processor where high frequency is conspicuous (regardless synchronizing or not synchronizing with rotation), when a disturbance has a large influence on the follow-up accuracy.

To achieve these objects, the head follow-up control method of the present invention has a feedback control step of calculating a follow-up control amount of the head based on a follow-up error of the head, a disturbance model update step of representing a disturbance model of frequency disturbance by weight composition of a sin function and a cos function, and sequentially updating the weight for the sin function and the cos function of the disturbance model by a learning rule of which input is a signal according to the follow-up error signal, a disturbance model value output step of outputting a disturbance model output value corresponding to a time lead by a time period for canceling a delay of the feedback control system to be the target, and a step of feeding the disturbance model value to the feedback control system.

In the present invention, the disturbance model is identified by the weighted sum of the sin and cos functions, so the disturbance model can be learned at high-speed, and the disturbance with the target frequency can be removed from the system. Also time lead compensation is used, so a high-frequency disturbance for which phase lag must be considered can be the compensation target.

In the present invention, it is preferable that the feeding step has a step of adding the disturbance model value to the input of the feedback control system. Also in the present invention, it is preferable that the feeding step has a step of adding the disturbance model value to the output of the feedback control system.

Also in the present invention, it is preferable that the feedback step has a step of calculating the feedback control signal for track follow-up control or focus follow-up control of the head based on the follow-up error signal for the track or focus position of the storage medium of the head.

It is preferable that the present invention further has a step of setting the disturbance model of the frequency disturbance for a plurality of different frequencies.

Also in the present invention, it is preferable that the feedback step has a step of calculating a follow-up control amount of the head based on a follow-up error of the head for the storage medium that rotates, and that the control method of the present invention further has a rotation synchronization signal learning step of learning a frequency component synchronizing rotation of the storage medium and feeding the frequency component to the feedback control system.

Also in the present invention, it is preferable that the disturbance model value output step has a step of outputting a disturbance model output value corresponding to a time lead by a time period for canceling a phase lag of the feedback control system. In the present invention, it is preferable that the disturbance model update step has a step of updating a disturbance model using the sin and cos functions approximated by a polynomial of degree n.

BRIEF DESCRIPTION OF THE DRAWINGS

FIG. 7 is a diagram depicting the transition of the learning output and the track error when the time lead compensation of the present invention is performed;

FIG. 8 is a diagram depicting the transition of the learning output and the track error when the time lead compensation of the present invention is not performed;

FIG. 25 is a diagram depicting the polynomial of degree two approximation of the trigonometric function and the approximation error according to another embodiment of the present invention (No. 1);

DESCRIPTION OF THE PREFERRED EMBODIMENTS

Embodiments of the present invention will now be described in the sequence of a storage device, follow-up control system, time lead compensation of the follow-up control system, another follow-up control system and other embodiments.

[Storage Device]

Figure 1:
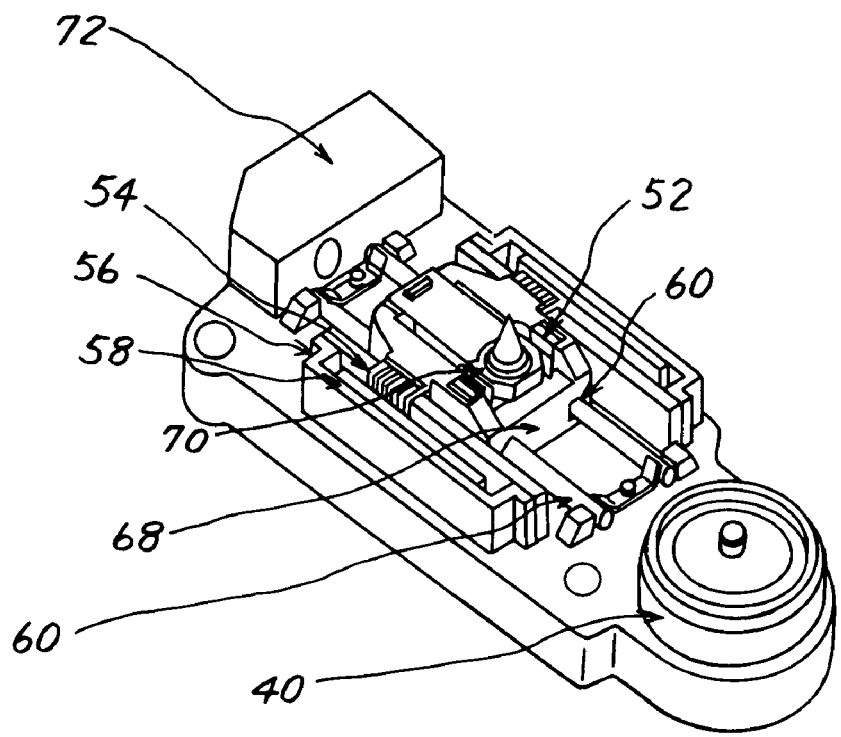
FIG. 1 is a diagram depicting a partial configuration of the storage device according to an embodiment of the present invention.
Figure 2:
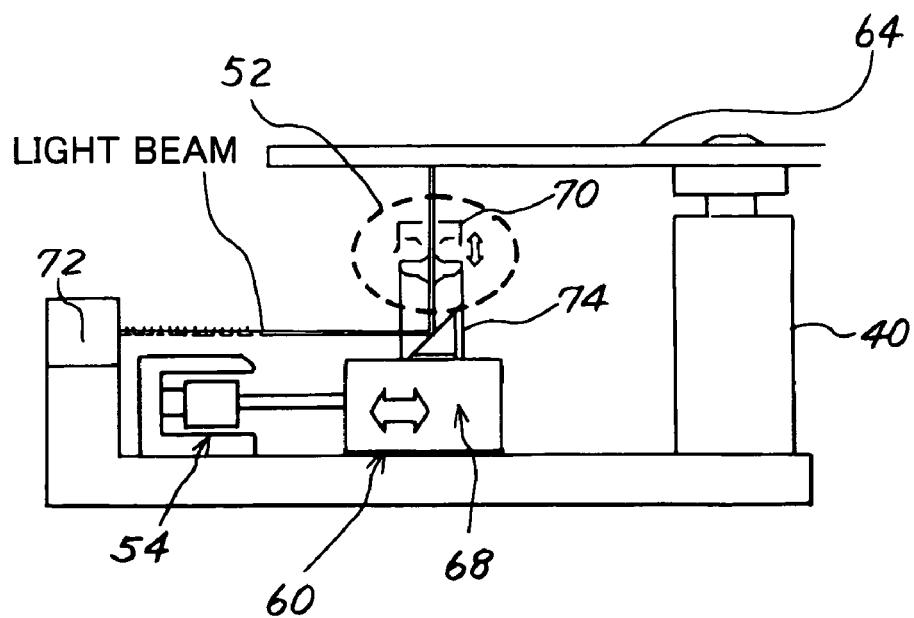
FIG. 2 is a cross-sectional view depicting the storage device in FIG. 1.

FIG. 1 and FIG. 2 are diagrams depicting the configuration of a storage device according to an embodiment of the present invention, showing a magneto-optical disk drive where a magneto-optical disk is used for the storage medium as the example. As FIG. 1 and FIG. 2 show, a spindle motor 40 is disposed in the drive mechanism. By inserting an MO (Magneto-Optical) cartridge into a hub of the rotation axis of the spindle motor 40 through the inlet door (not illustrated), the MO medium 64 inside the cartridge is set to the hub of the rotation axis of the spindle motor 40.

The head mechanism is comprised of a carriage 68, objective lens 70, fixed optical system 72 and mirror 74. Below the MO medium 64 of the loaded MO cartridge, a carriage 68, which can be moved by the VCM 54 in a direction crossing the tracks of the medium, is disposed.

The objective lens 70 is installed on the carriage 68 so that the beam from the laser diode disposed in the fixed optical system 72 is entered via the rise mirror 74, and a beam spot is formed on the medium surface of the MO medium 66. The movement of the objective lens 70 is controlled by the focus actuator 52 in the optical axis direction. By the VCM 54, the optical beam can be moved using the linear drive of the carriage 68 in the radius direction crossing the tracks of the medium.

The VCM coil 54 is disposed on the carriage 68, and the magnet 58 and the yoke 56 are disposed at the fixed side. This constitutes the VCM 54 of the carriage 68. The carriage 68 is supported by the two guide rails 60 which are fixed via the sliding bearings, and the VCM 54 can simultaneously perform seek control for moving the optical beam to an arbitrary track position, which is known as coarse control, and tracking control for the optical beam to follow up to the track center at the track position after seek, which is known as fine control.

For such a single drive type head mechanism, the one stated in Japanese patent Application Laid-Open No. H9-312026 and Japanese Patent Application Laid-Open No. H9-54960 can be used.

The above embodiment was described using a magneto-optical disk device, but the present invention can also be applied to a storage device using another storage medium, such as an optical disk device and a magnetic disk device.

[Follow-Up Control System]

Figure 3:
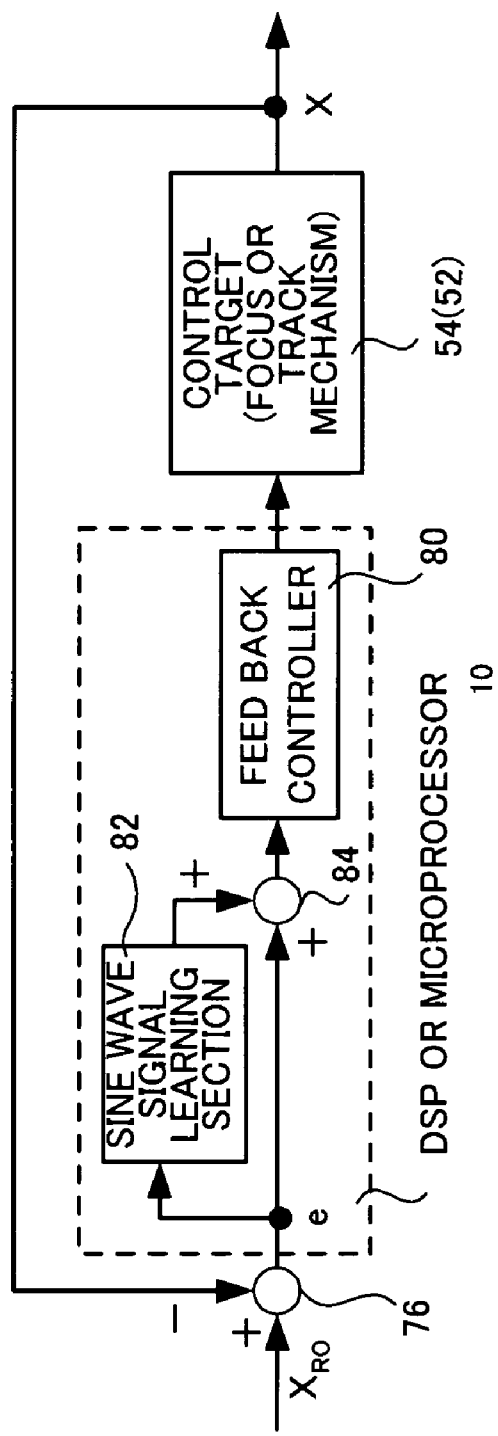
FIG. 3 is a block diagram depicting an embodiment of the follow-up control system of the storage device in FIG. 1.
Figure 4:
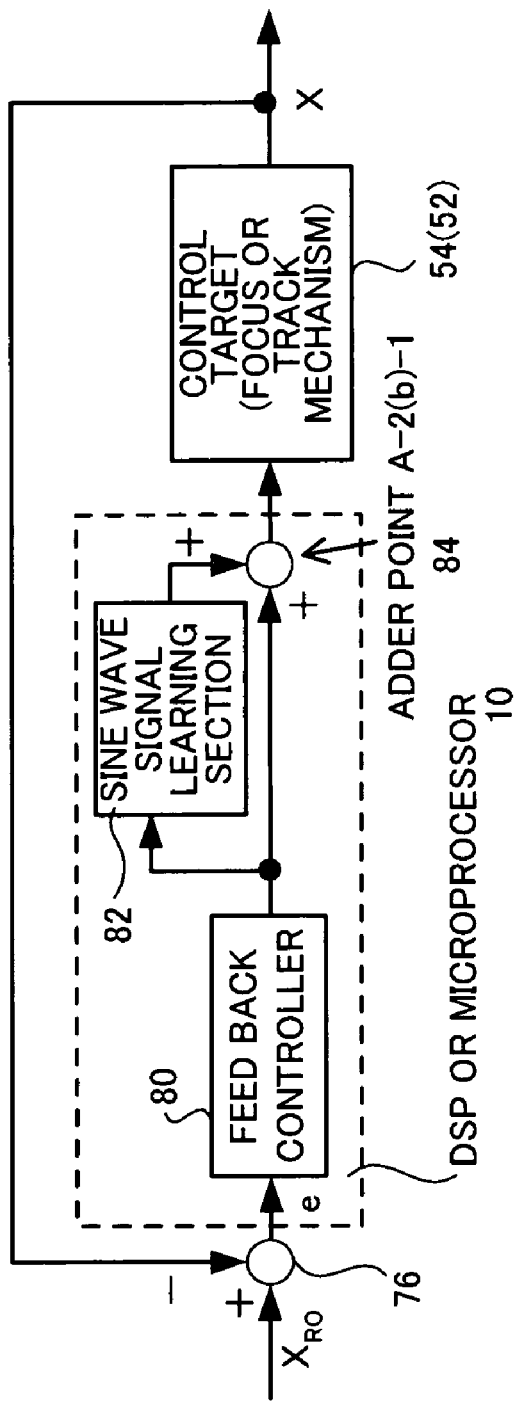
FIG. 4 is a block diagram depicting another embodiment of the follow-up control system of the storage device in FIG. 1.

FIG. 3 is a block diagram depicting the follow-up control system of the head mechanism in the disk device according to an embodiment of the present invention, and FIG. 4 is a block diagram depicting the follow-up control system of another embodiment. In the embodiment in FIG. 3, the sine wave signal learning section 82 is disposed in the input stage of the feedback control section (controller) 80, and in the embodiment in FIG. 4, it is disposed in the output stage of the feedback control section 80.

In FIG. 3, the follow-up control system of the head mechanism is comprised of the control target 54 (52), feedback control section 80, sine wave signal learning section 82 and adder 84. In the above mentioned disk device, the follow-up control system is comprised of the focus control system and the track control system. In the focus control system, the control target is comprised of the focus. actuator 52 and an object lens which is driven by the focus actuator 52, and in the track control system, the control target is comprised of the carriage drive section (VCM) 54 and the carriage 68. The focus and track control system also includes the drive amplifier, which drives the respective component.

In FIG. 3 and FIG. 4, the follow-up error signal is indicated by "e". In the track control system, the follow-up error signal e is a tracking error signal TES, and the tracking error detection section, which is not illustrated, generates the tracking error signal TES, which indicates the positional shift amount from the track center, using the return light of the optical beam from the medium 64 returned by the object lens 70 mounted on the carriage 68. For the input of this tracking error detection section, the eccentric disturbance XRO, due to the eccentricity of the disk medium 64, is added from the addition point 76.

The feedback control section 80 receives the tracking error signal TES (in FIG. 3 however, it receives the added value of TES and the output value of the sine wave signal learning section), and calculates the feedback command value for the carriage drive section 54 to move the carriage 68, so that the shift of the optical beam from the track center is canceled.

The feedback control section 80 calculates the control signal IFB by the PID (Proportional Integration and Difference) operation, for example, and this control signal IFB becomes the feedback current command value for the carriage drive section 54 using the VCM shown in FIG. 2.

As FIG. 3 shows, when the sine wave signal learning section 82 is applied to the follow-up error signal (focus error signal or track-error signal), the sine wave signal learning section 82 extracts the preset specific frequency components in the direction to make the error signal e to be "0", integrates the frequency components and outputs the result. Therefore when the sine wave signal learning section 82 is integrated into the control system in this way, the compensation signals for the preset specific frequency components are finally output after learning. In other words, the influence of the disturbance of the frequency can be removed (suppressed).

This compensation signal (feed forward signal) IFF is added to the follow-up error signal e by the adder 84, and is input to the feedback control section 80. The feedback control section 80 calculates the above mentioned feedback command value and drives the carriage 68 by the carriage drive section 54 using the drive signal IVCM according to the command value. In other words, the feed-forward control is performed for the feedback control system.

The feedback control section 80, sine wave signal learning section 82 and addition section 84 are implemented by a processor 10, such as a DSP (Digital Signal Processor). In the focus control system, the follow-up error signal e is a focus error signal. The focus error detection section generates the focus error signal FES, which indicates the positional shift amount from the focus position of the medium, using the return light of the optical beam from the medium 64 returned by the objective lens 70 mounted on the carriage 68. The feedback control section 80 outputs the drive signal for driving the focus actuator 52.

As FIG. 4 shows, the sine wave signal learning section 82 may be applied to the output of the feedback controller 80. In this case, the sine wave signal learning section 82 is disposed between the feedback controller 80 and the control target 54 (52).

The sine wave signal learning section 82 extracts the preset specific frequency components in the direction to make the output of the feedback controller 80 to be "0", integrates the frequency components and outputs the result. By making the output of the feedback controller 80 to be "0"means that error e, which is the input of the feedback controller 80, becomes "0", so the signal for suppressing the disturbance of the preset specific frequency can be generated by this configuration as well.

As described later, the sine wave signal learning section 82 represents the disturbance model of frequency disturbance by the weight composition of the sin function and the cos function, and has a disturbance model update section which sequentially updates the weight for the sin function and the cos function of the disturbance model by a learning rule of which the input is a signal following the error signal, such as a focus error signal or a track error signal, and a disturbance model value output section which computes the updated disturbance model and sequentially outputs the disturbance model value.

The sine wave signal learning section 82 has a function to extract the sine wave signals which: have a preset specific frequency out of the input signals, and integrates and outputs the sine wave signals. In the case of the configuration in FIG. 3, preset specific frequency components are extracted from the error signals, the frequency components is integrated and the result is outputted, and the integration stops when the error becomes zero.

In this way, the sine wave signal learning section 82 performs feed-forward sequentially based on the identification result, so the disturbance can be compensated even if the amplitude and the phase of the target disturbance fluctuate. Also in the present invention, time lead compensation is used in the sine wave signal learning section 82. By this, the frequency disturbance due to high frequency, for which phase lag must be considered, can be the compensation target. For example, frequency disturbance, due to a frequency near or higher than the control band of the focus control system and track control system, can be efficiently suppressed.

Figure 5A:
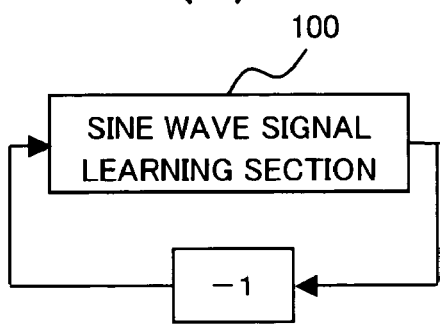
FIGS. 5(A) and 5(B) are diagrams depicting the time lead compensation of the sine wave signal learning section in FIG. 1.
Figure 27A:
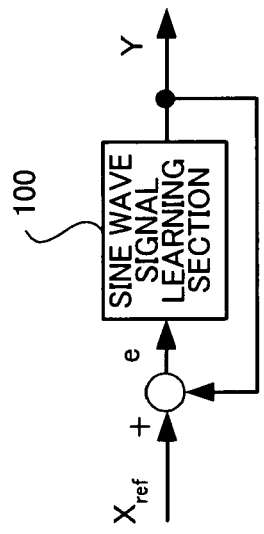
FIGS. 27(A) and 27(B) are diagrams depicting a conventional follow-up control system where the conventional sine wave signal learning section is integrated.
Figure 27B:
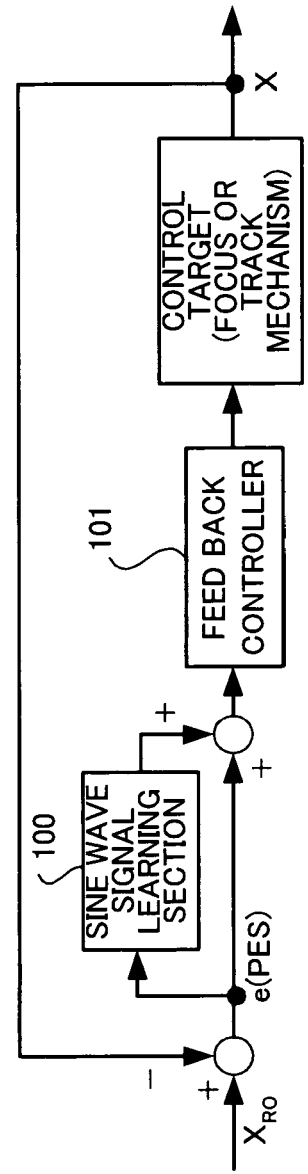

This sine wave signal learning section 82, for which time lead compensation is used, will be described with reference to FIG. 5 to FIG. 9. According to the principle of the sine wave signal learning section described in FIG. 27(A), the output of the sine wave signal learning section is directly fed back and is reflected again to the input to the sine wave signal learning section as an error signal. In other words, As FIG. 5(A) shows, the sine wave signal learning section is constructed such that the output result of the sine wave signal learning section is immediately reflected to the input of the sine wave signal learning section without any phase lag.

Figure 5B:
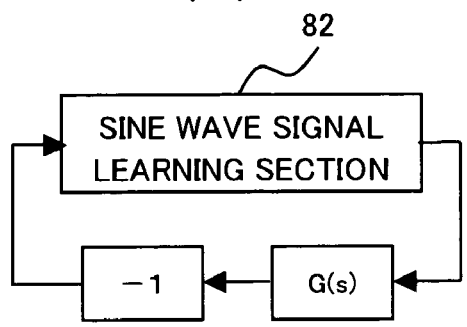

On the other hand, when the sine wave signal learning section 82 is integrated as part of the feedback control system, as shown in FIG. 5(B), a delay is generated until the output of the sine wave signal learning section 82 is reflected again to the input thereof. Such a phase lag affects the stability of learning, so there must be compensation. In FIG. 5(B), G(s) indicates the transfer function of this delay. FIG. 5(A), which is the ideal case, is the case of G(s)=1.

Figure 6:
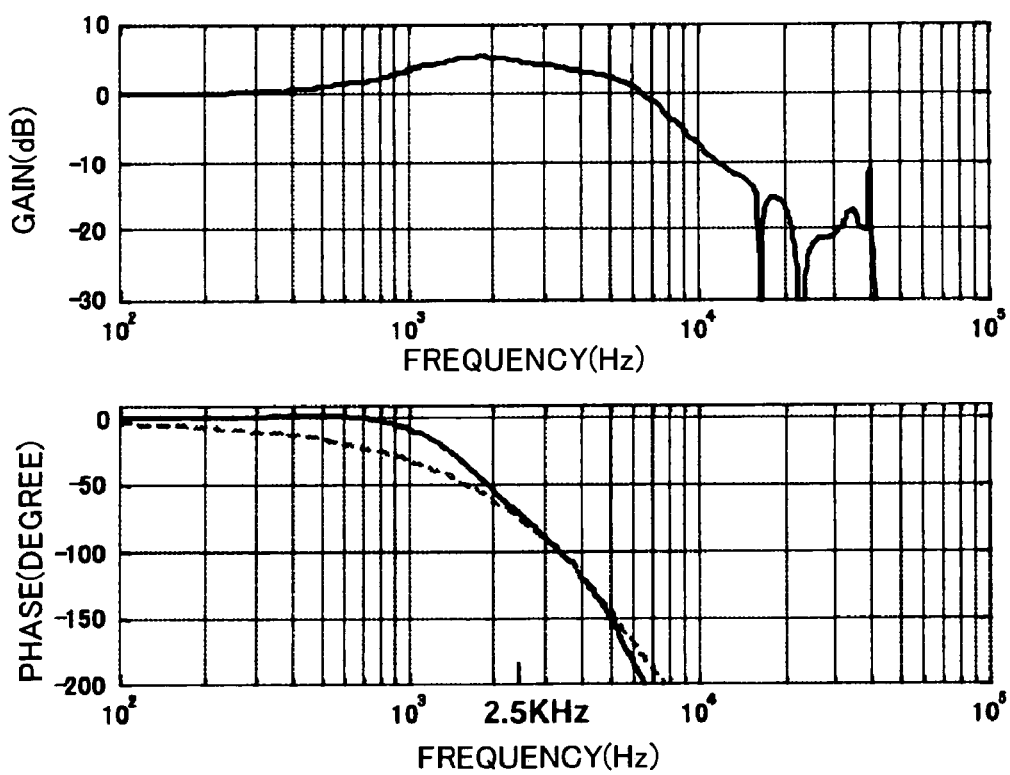
FIG. 6 is a diagram depicting the complementary sensitivity characteristic of the feedback control system to be the target of the time lead compensation in FIG. 5.

When the sine wave signal learning section 82 is integrated into the control system, as shown in FIG. 3 and FIG. 4, G(s) shown in FIG. 5(B) becomes the so called complementary sensitivity function characteristic of the feedback control system before integrating the sine wave signal learning section 82. FIG. 6 is an example of a typical complementary sensitivity function (that is, G(s) in the configuration in FIG. 3 and FIG. 4) of the track follow-up control system of the optical disk device. This is an example of the track control system with a 2.5 kHz control band. Generally the complementary sensitivity function characteristic indicates the low pass characteristic, where a phase lag does not occur in the low frequency area, and a phase lag increases in the high frequency area.

For example, in the case of the example in FIG. 6, the phase lag is almost "0" with a frequency of less than 800 Hz. With a frequency of more than this, phase lag increases and cannot be ignored. In other words, with a frequency close to or exceeding the control band (2.5 kHz), the phase lag cannot be ignored. Therefore to construct a sine wave learning control system to suppress the frequency disturbance in this area, this phase lag must be considered.

In the present invention, the following time lead compensation is used for enabling the compensation of the frequency disturbance which exists in such a high frequency area. In other words, the output Y (t) of the sine wave signal learning section 82 is calculated by the following formula (5) when n number of frequency signals are the learning target.

$$Y(t) = \sum_{i=1}^{n} [a_i(t) \cdot \sin(2 \cdot \pi \cdot f_{di} \cdot (t + \Delta t_i)) + b_i(t) \cdot \cos(2 \cdot \pi \cdot f_{di} \cdot (t + \Delta t_i))] \quad (5)$$

In the formula (5), "i" is a number for identifying the frequency, and an individual frequency is represented by fdi. In other words, when the sine wave signal learning section 82 outputs an output value the sine wave signal learning section outputs the output value for the time, which is lead by $\Delta t_i$ from the current time t. For the learning rule of which the learning target is a plurality of frequency signals, the following formula (6), after the formula (3) is transformed, is used.

$$\begin{cases} \dot{a}_i(t) = k \cdot \sin(2 \cdot \pi \cdot f_{di} \cdot t) \cdot e(t) \\ \dot{b}_i(t) = k \cdot \cos(2 \cdot \pi \cdot f_{di} \cdot t) \cdot e(t) \end{cases} \quad (6)$$

for $1 \le i \le n$

When the number of compensation target frequencies is one, the sine wave signal learning result output equation is the following formula (7) after the formula (4) is transformed.

$$Y(t)=a(t)\times\sin(2\pi \times fd \times (t+t))+b(t)\times\cos(2\pi \times fd \times (t+t)) \quad (7)$$

The learning rule in this case is the same as the above mentioned formula (3).

FIG. 7 are diagrams depicting the track error amount (μm) and the learning output according to an embodiment of the present invention, and FIG. 8 are diagrams depicting the track error amount (μm) and the learning output according to a conventional learning control system (Japanese Patent Application Laid-Open 2000-339729).

A conspicuous frequency disturbance which occurs in the tracking control system and the focus control system of an optical disk is a disturbance due top eccentric frequency synchronizing disk rotation. Such a disturbance due to eccentric frequency can be effectively suppressed even by a conventional learning control system. However, when the present invention is used, the eccentric frequency disturbance compensation signal can be learned and acquired at a higher speed, and the disturbance can be suppressed more quickly.

FIG. 7 and FIG. 8 show the comparison result (simulation result) between the present invention and conventional learning when the same learning gain is provided. In both cases, learning started in 0.0133 seconds. The rotation frequency of the disk is 75 Hz, and the rotation cycle is 0.0133 seconds.

In the conventional learning method, the rotation cycle is divided into N, and N number of values corresponding to the respective divided areas become the learning target (e.g. the rotation cycle is divided into 32, and 32 values are learned), so time for converging learning is required after the disk rotates once since each value must be learned. Also since decreasing the learning gains in the case considering the influence of noise, several cycles of learning time are generally required, as shown in FIG. 8.

In the case of the method of the present invention, on the other hand, the number of parameters to be learned is 2 (the weights for the sine and cosine functions) per frequency, and as the learning rule of the formula (6) shows, the update operation is constantly executed. In the case of a conventional learning control system, the update operation for N number of parameters is executed only in the corresponding time block, but in the case of the present invention, learning can be performed at high-speed, and convergence is also at high-speed because time lead compensation is used.

In the example in FIG. 7, the target frequency is only 75 Hz, so 2 parameters are to be learned, which are constantly updated. As the comparisons in FIG. 7 and FIG. 8 show, learning can be converged in an extremely short time within 1 cycle of a disk rotation in the case of the present invention, even if the learning gain to be set is the same.

Figure 9:
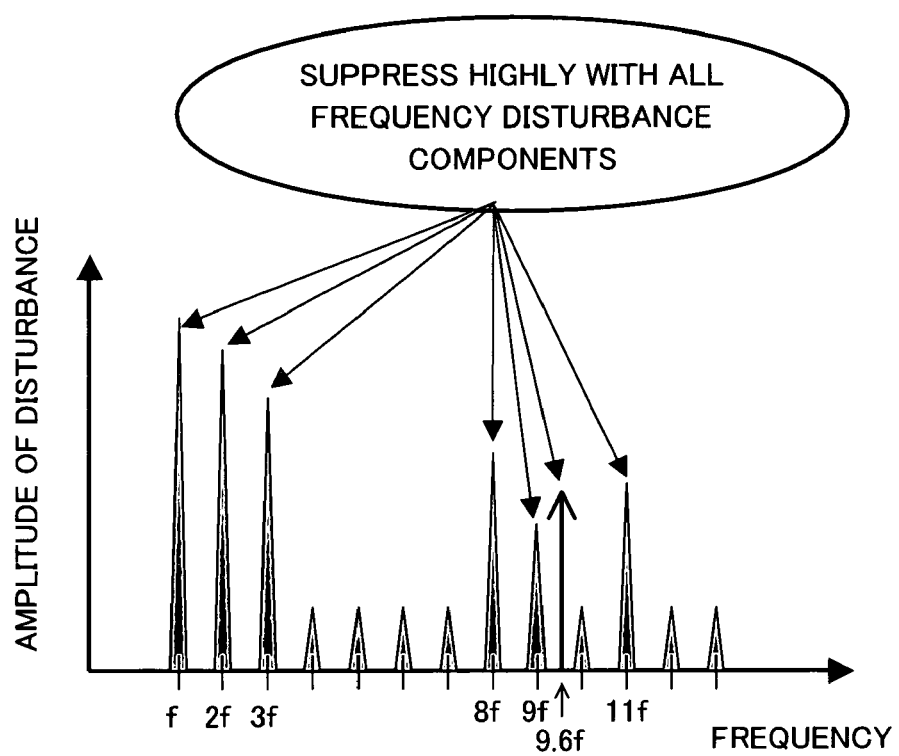
FIG. 9 is a diagram depicting the frequency disturbance suppression effect according to the present invention.

FIG. 9 is a diagram depicting the frequency disturbance suppression effect by the present invention. As FIG. 9 shows, according to the present invention, all conspicuous frequency disturbance components can be learned and suppressed at high-speed by the combination of the sine wave learning rule and the time lead compensation output.

Figure 10:
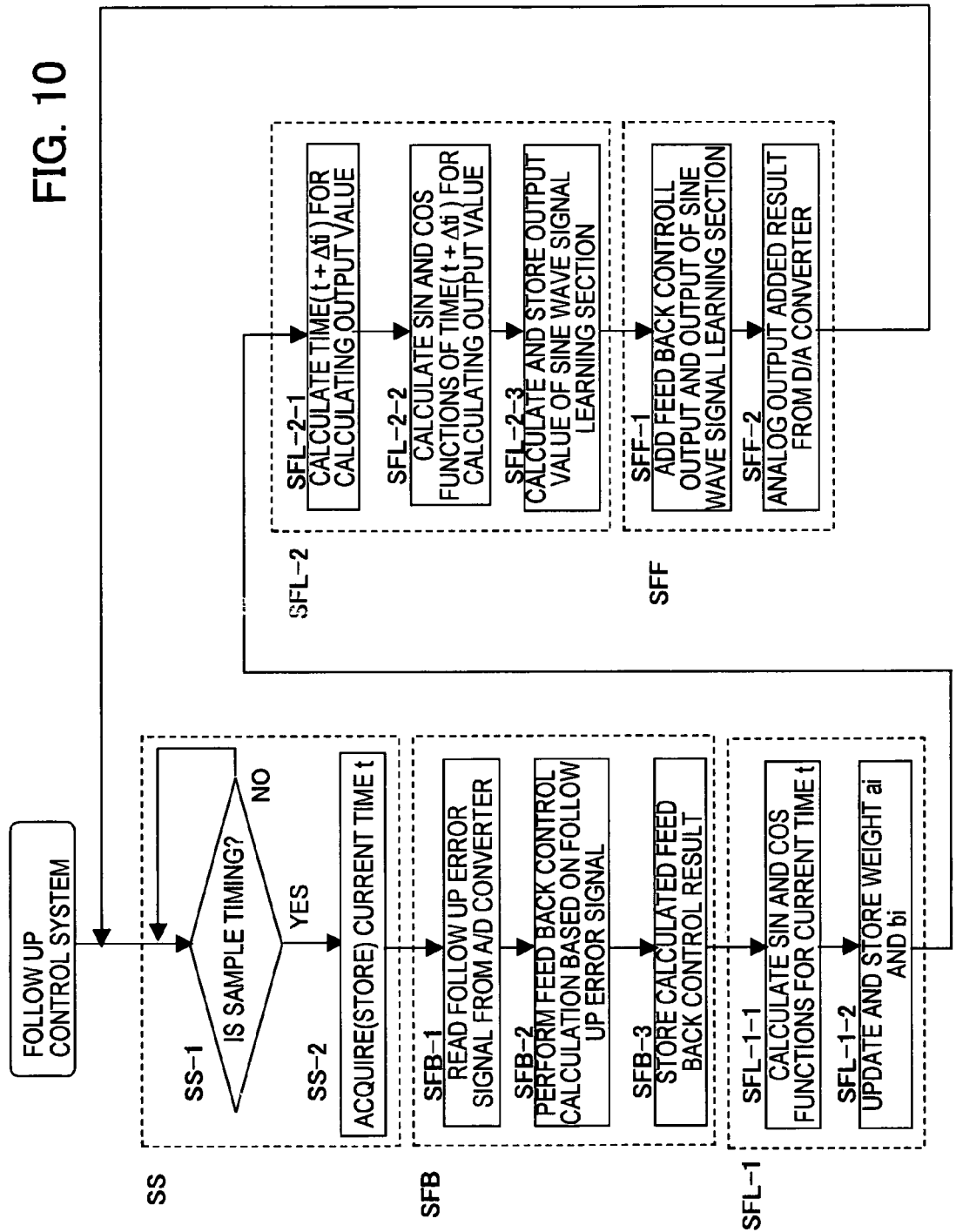
FIG. 10 is a flow chart depicting the follow-up control of the configuration in FIG. 4.

FIG. 10 is a flow chart depicting the follow-up control processing executed by the processor 10 in the case of when the sine wave signal learning section 82 is integrated into the follow-up control system with the configuration in FIG. 4. The computing processing surrounded by the dotted line frame is implemented by a DSP or microprocessor 10. The follow-up error signal e is converted into a digital quantity by the A/D converter (not illustrated). The final operation result is output to the driver circuit of the control target 54 (52) via the D/A converter. In the DSP 10, a series of processing in the dotted line frame, for example, is executed in a same sampling period.

The dotted line frame SS is a part for managing the sampling period of the follow-up control system. The sampling period is managed by a timer, counting basic clocks, for example, and the follow-up control task (processing) is activated at a predetermined period by interrupt processing, for example. At the sampling timing (SS-1) the sampling time t is acquired and stored (SS-2). The sampling time t is determined by reading the count value of the basic clock or by counting the sampling period.

The dotted line frame SFB indicates the computing processing of the feedback controller 80. The current follow-up error signal e is read (SFB-1) via the A/D converter, and the operation of the "feedback controller" is executed based on the value of the current follow-up error signal e (SFB-2). The "feedback controller" performs a filter operation of the conventional PID (Proportional Integration, Differential) compensator. This operation result is stored for subsequent processing (SFB-3).

The dotted line frame SFL-1 indicates the learning processing section of the sine wave signal learning section 82. In this section, the learning rule shown in the above mentioned formula (6) is executed. As the approximate error signal e (t) shown in the formula (6), however, the output value IFB (t) of the feedback controller 80 is used in this example.

Also the formula (6) is represented by continuous time, but a discrete time is used for processing on the DSP 10, so learning processing is represented by the following formula (8).

$$\begin{cases} a_i(N) = a_i(L) + k \cdot T_s \cdot \sin(2 \cdot \pi \cdot f_{di} \cdot t) \cdot I_{FB}(t) \\ b_i(N) = b_i(L) + k \cdot T_s \cdot \cos(2 \cdot \pi \cdot f_{di} \cdot t) \cdot I_{FB}(t) \end{cases} \quad (8)$$

for $1 \leq i \leq n$

Here ai (L) and bi (L) indicate the ai and bi values. before update, and ai (N) and bi (N) indicate the ai and bi values after update. k is the learning gain, and Ts is the sampling period.

In SFL-1-1, the sin and cos function values at the current time t stored in SS-2 are calculated. In other words, based on the time t, the sin and cos values for each frequency fdi to be the suppression target are calculated by the following formula (9).

$$\begin{cases} \sin(2 \cdot \pi \cdot f_{di} \cdot t) \\ \cos(2 \cdot \pi \cdot f_{di} \cdot t) \end{cases} \quad (9)$$

for $1 \leq i \leq n$

A standard DSP may not have a library of sin and cos functions. In this case, the sin and cos values may be computed by referring to a table, for example, or may be computed by a later mentioned piecewise approximation polynomial. In SFL-1-2, the just determined sin and cos values are used, and the weights of the ai and bi values are updated and stored by the formula (8).

The dotted line frame SFL-2 indicates the output processing of the sine wave signal learning section 82. In this processing, the output value of the sine wave signal learning section 82 is calculated using the latest ai and bi values updated in SFL-1, as the above mentioned formula (5) shows.

At first, in SFL-2-1, the value of time (t+Δti), where the designed time lead compensation Δti is added, is calculated. Δti is designed by the formula (11), which will be described later in the section on time lead compensation, for example. However, a sufficiently stable convergence is often acquired even if the value calculated by the formula (11) itself is not used, so the value Δti may be set as a common for some frequencies, so as to decrease the calculation amount.

In SFL-2-2, the sin and cos values for the calculated time (t+Δti) are calculated. In other words, the sin and cos values are calculated for each frequency fdi to be the suppression target by the following formula (10).

$$\begin{cases} \sin(2 \cdot \pi \cdot f_{di} \cdot (t + \Delta t_i)) \\ \cos(2 \cdot \pi \cdot f_{di} \cdot (t + \Delta t_i)) \end{cases} \quad (10)$$

for $1 \leq i \leq n$

Then in SFL-2-3, the output value of the sine wave signal learning section 82 is calculated by the formula (5) using the sin and cos values calculated in SFL-2-2 and the latest ai and bi values which were updated and stored in SFL-1-2, and the result is stored. In other words, the latest ai and bi values are substituted for ai (t) and bi (t) in the formula (5), and the calculation result Y (t) is stored.

The dotted line frame SFF is the processing to calculate and output the output value of the follow-up control system. The feedback controller output calculated in SFB-3 and the output value of the sine wave signal learning section calculated in SFL-2-3 are added (SFF-1), and the addition result is analog-output through the D/A converter (SFF-2).

In this way, all the conspicuous frequency disturbance components can be learned and suppressed at high-speed by the combination of the sine wave learning rule and the time lead compensation output.

[Time Lead Compensation of Follow-Up Control System]

The design method for the time lead compensation value is as follows. When the frequency of the signal to be the learning target is fdi, the time lead compensation value Δti is calculated by the following formula (11).

$$\Delta ti = \angle G(fdi)/(360 \times fdi) \tag{11}$$

Here ∠G (fdi) is a phase lag amount at frequency fdi of the transfer function G (s) in FIG. 5(B), and the unit is degrees (in the case of radian unit, "360" in the formula (11) is replaced with "2π").

The formula (11) is a formula for converting the phase lag amount ∠G (fdi) degrees at frequency fdi [Hz] into a time unit. Therefore by using the time Δti determined by this formula as the time lead compensation value in the formula (5), the phase lag at frequency fdi which is generated at G (s) in FIG. 5(B) can be canceled and a learning equivalent to the case in FIG. 5(A) where there is no lag can be executed.

FIG. 11 to FIG. 19 are diagrams showing the result of simulation examples to show the effect of the compensation of the present invention. In these simulations, the target is the track follow-up control system shown in FIG. 4. The complementary sensitivity function characteristics of this feedback control system are shown in FIG. 6. As mentioned above, the control band (zero cross frequency of open loop characteristics) of this system is 2.5 kHz. The case when the frequency disturbance at fd=3 kHz exists in such a system is assumed.

The output model of the sine wave signal learning section 82 is the following formula, which is equivalent to the case when n=1 is used in the formula (5), and fd=3 kHz.

$$Y(t)=a(t)\cdot\sin(2\pi\cdot fd\cdot(t+\Delta t))+b(t)\cdot\cos(2\pi\cdot fd\cdot(t+\Delta t)) \tag{5-1}$$

The learning rule is the formula (3). When the control system with the configuration shown in FIG. 4 is used, the complementary sensitivity function characteristic of the feedback control system corresponds to G(s) in FIG. 5(B). According to the complementary sensitivity function characteristic shown in FIG. 6, the phase lag amount at fd=3 kHz is ∠G (3 kHz)=90 degrees. Therefore the design value for the time lead amount is Δt=90/(360*3000)=8.3 e−5 (sec.) by the formula (11).

Figure 11:
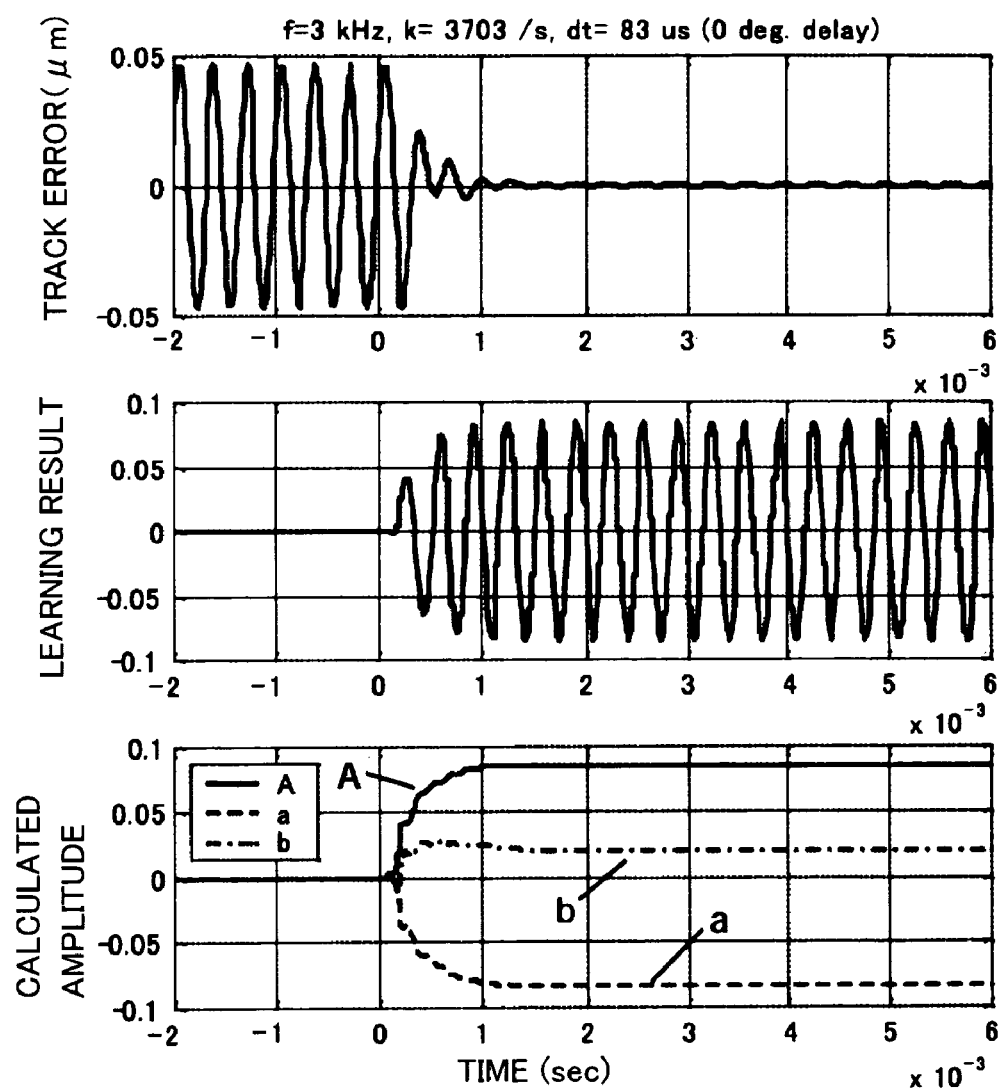
FIG. 11 is a diagram depicting the characteristics of the first embodiment of the time lead compensation according to the present invention.

FIG. 11 shows the result of simulation which was conducted with setting the time lead amount Δt as above. The diagram at the top shows the tracking error, where learning started from time "0". The band of the control system is 2.5 kHz, and the disturbance of the frequency exceeding this band was applied, and the tracking error is largely influenced by the disturbance before learning, but is quickly suppressed after learning starts. The diagram in the middle shows the output of the sine wave signal learning section 82 based on the formula (5-1). The diagram at the bottom shows the time-based change of a(t), b(t) and A, which are sequentially updated by the learning rule (3). The output shown in the diagram in the middle is generated and output by the formula (5-1) using the a(t) and b(t) values each time in the diagram at the bottom.

As the learning convergence process of the a (t) and b (t) values in the diagram at the bottom shows, the a (t) and b (t) values are very stably converging, therefore the tracking error shown in the diagram at the top also converges quickly.

Figure 12:
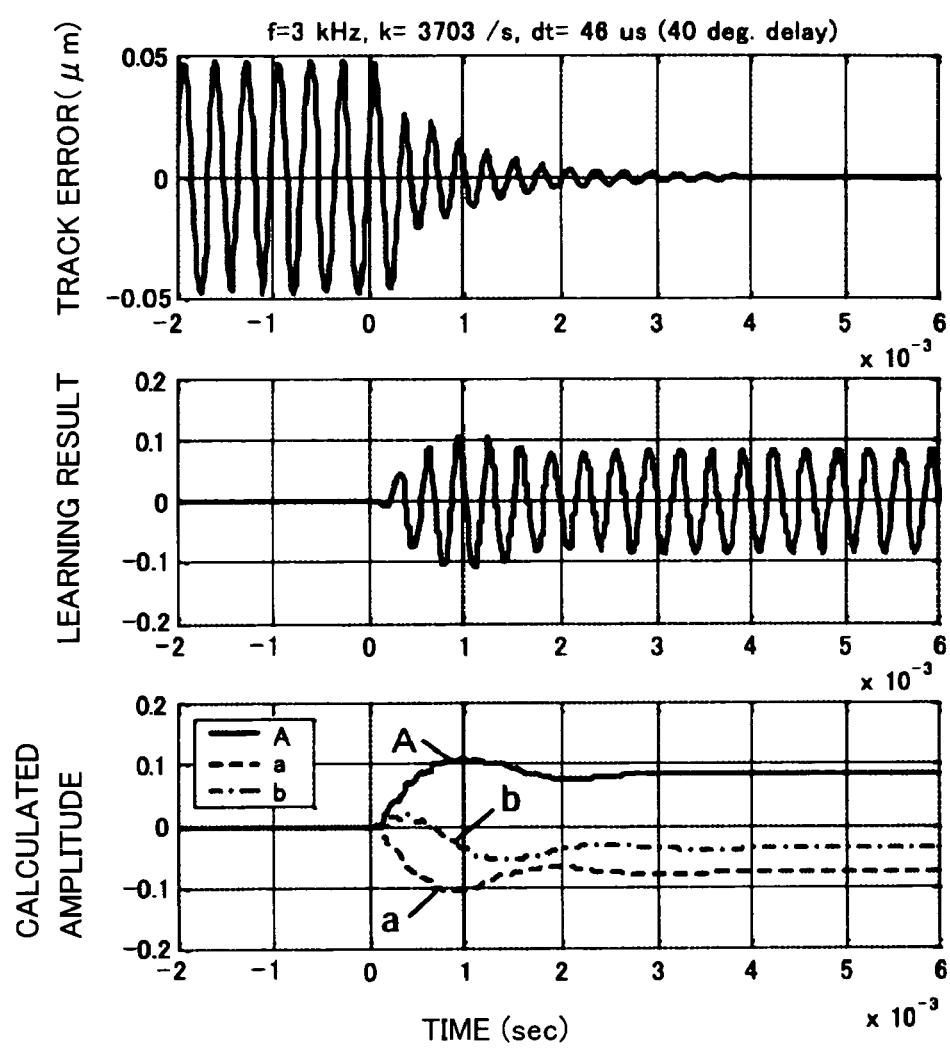
FIG. 12 is a diagram depicting the characteristics of the second embodiment of the time lead compensation according to the present invention.

FIG. 11 shows the case when the time lead amount 8.3 e−5 (sec.), which can completely cancel the phase lag amount 90° at 3 kHz, is provided according to formula (11), but FIG. 12 is an example when the time lead amount is 4.6 e−5 (sec.). This time lead amount corresponds to ⅚ of 8.3 e−5 (sec.) and is an amount that can compensate 50° out of the above mentioned phase lag amount 90°.

Therefore this corresponds to the status where 40° of phase lag exists. The learning gain k is the same value as the case in FIG. 11.

In the case of FIG. 12 as well, learning converges. As the converging process of the parameters a and b in the diagram at the bottom in FIG. 12 shows, an overshoot is generated, compared with the case of FIG. 11. Therefore even if the learning gain k is the same, the converging speed of the tracking error is slower in the case of FIG. 12, as shown in the diagram at the top.

Figure 13:
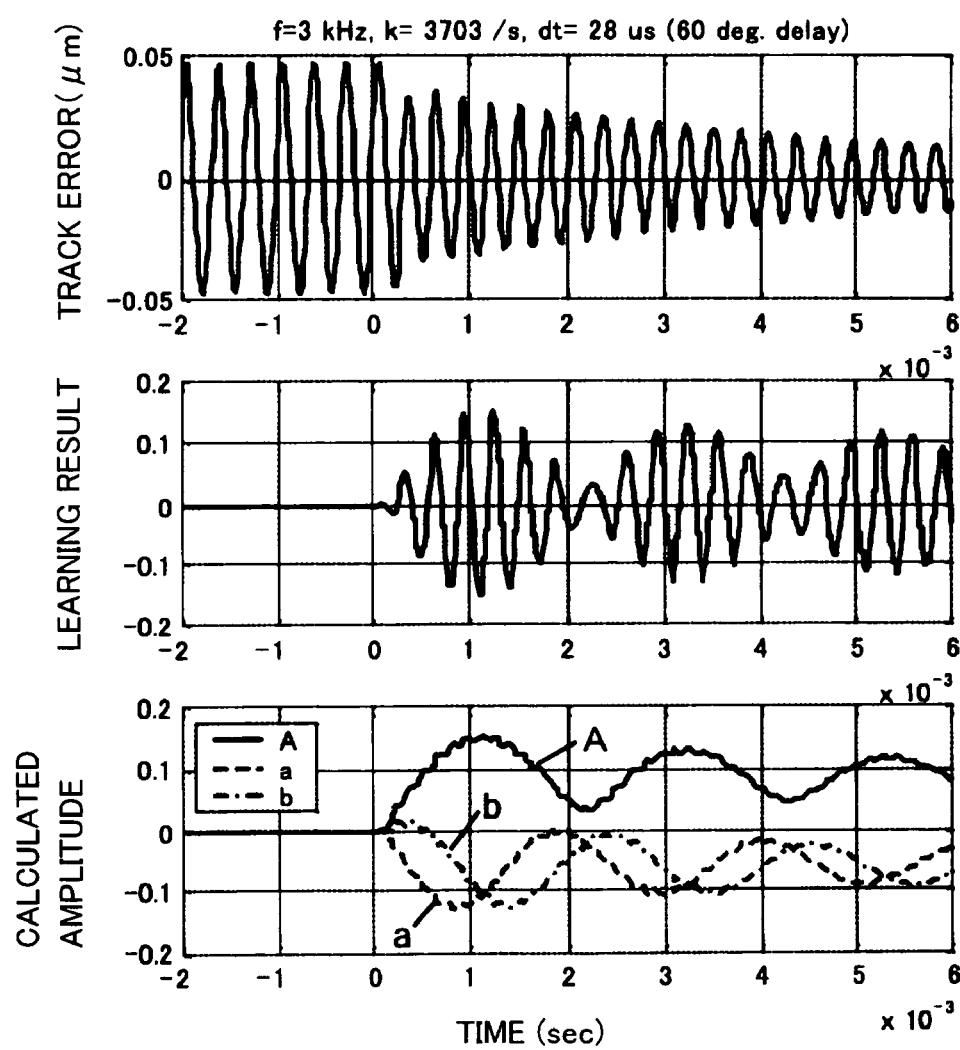
FIG. 13 is a diagram depicting the characteristics of short time recording of the third embodiment of the time lead compensation according to the present invention.
Figure 14:
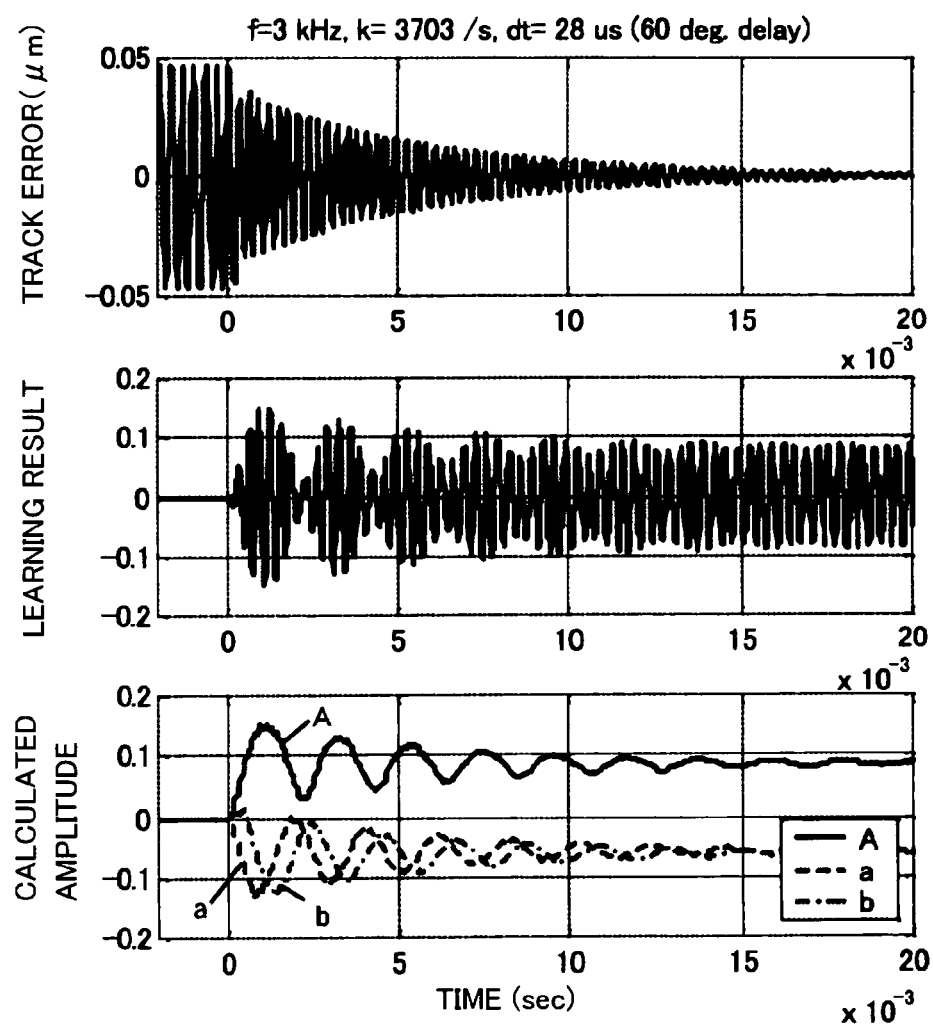
FIG. 14 is a diagram depicting the characteristics of long time recording of the third embodiment of the time lead compensation according to the present invention.

FIG. 13 and FIG. 14 are cases when the lead compensation amount is decreased even more, to 2.8 e−5 (sec.). This lead amount is equivalent to ⅓ of the case of FIG. 11, and is an amount that can compensate 30° out of the above mentioned phase lag amount 90° at 3 kHz. Therefore this case is equivalent to the state where 60° of the phase lag exists. The learning gain k is the same value as those in FIG. 11 and FIG. 12.

FIG. 13 is shown in the same time scale as FIG. 11 and FIG. 12, and FIG. 14 shows data recorded for a long time. In this case, as the diagram at the bottom shows, the parameter values a (t) and b (t) oscillate considerably in the converging process, and learning stability deteriorates. The convergence of the tracking error is also extremely slow, even though the learning gain k is the same as FIG. 11 and FIG. 12.

Figure 15:
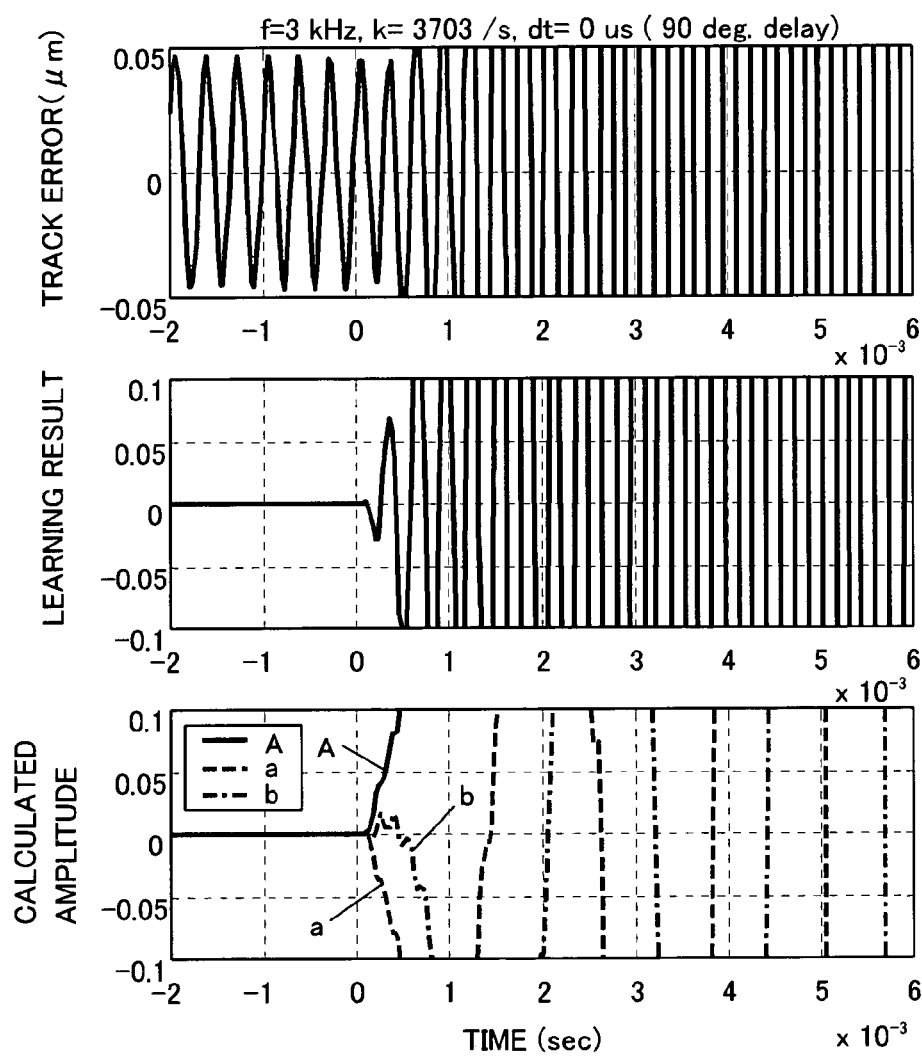
FIG. 15 is a diagram depicting the characteristics of short time recording according to a comparison example where time lead compensation is not performed.
Figure 16:
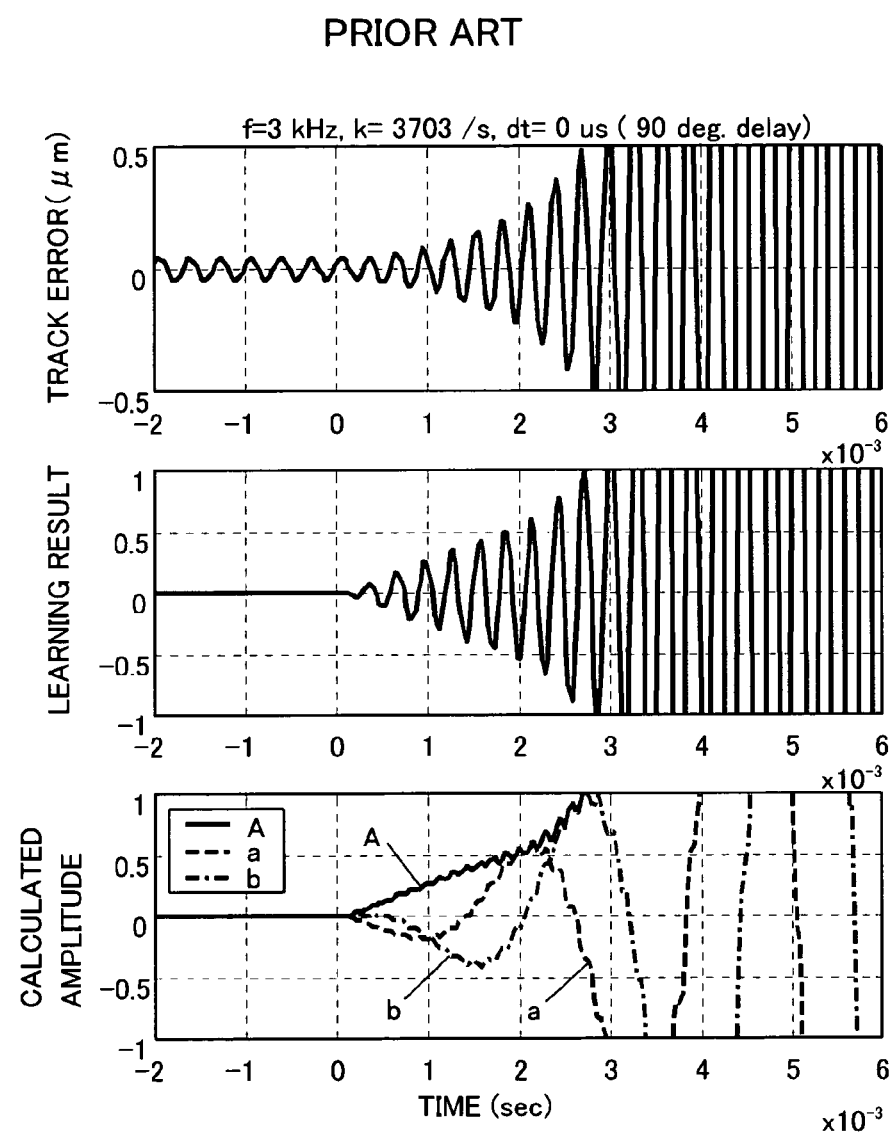
FIG. 16 is a diagram depicting the characteristics of long time recording according to a comparison example where time lead compensation is not performed.

FIG. 15 and FIG. 16 are the cases when time lead compensation is not performed at all, this is the prior art, where Δt=0. The learning gain k is the same value as those in FIG. 11 and FIG. 12.

FIG. 15 is shown in the same time scale as FIG. 11, FIG. 12 and FIG. 13, and FIG. 16 shows data recorded for a long time. In this case, as the diagram at the bottom shows, the parameter values a (t) and b (t) are dispersed and do not converge. As the diagram of the learning result in the middle shows, unlike the cases of FIG. 11 to FIG. 14 where time lead compensation is performed, the learning result does not converge to a predetermined amplitude, but disperses. Therefore the track follow-up error shown in the diagram at the top is not improved, and continues to deteriorate.

The above results show that time lead compensation is extremely effective in securing stability, and that the time lead amount shown in the formula (11) is the optimum value. As described above, even a frequency disturbance close to the control band or exceeding the control band can be effectively and stably compensated by using the time lead compensation.

Figure 17:
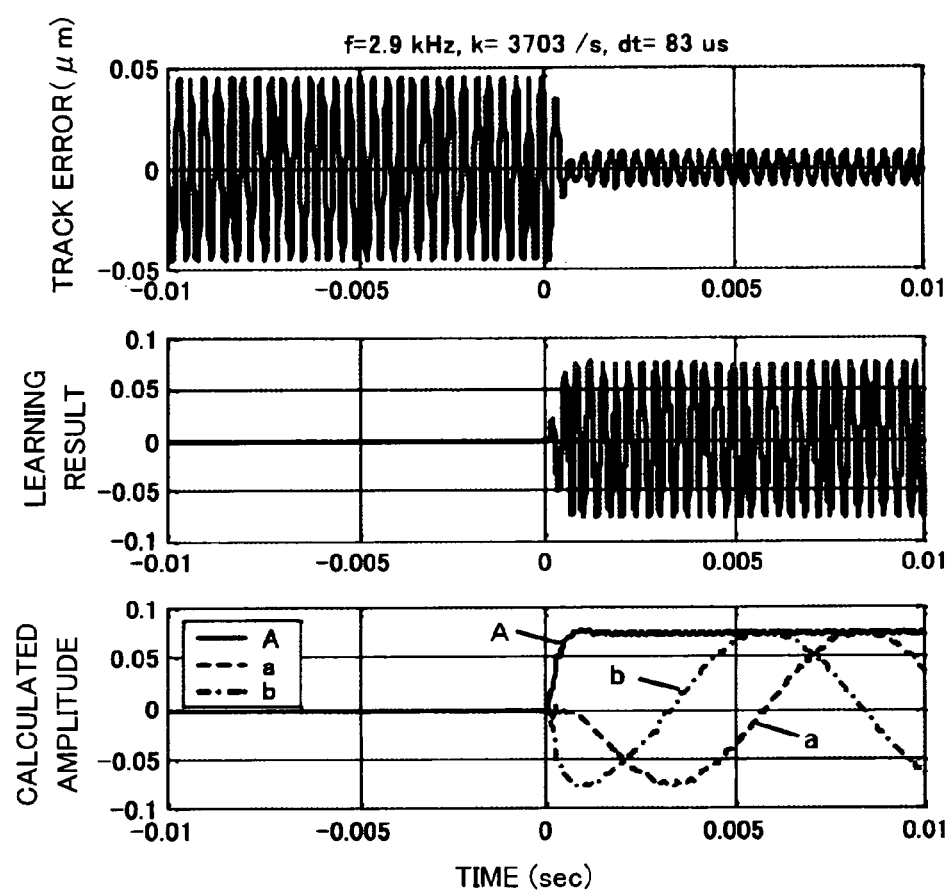
FIG. 17 is a diagram depicting the characteristics of the fourth embodiment of time lead compensation according to the present invention.
Figure 18:
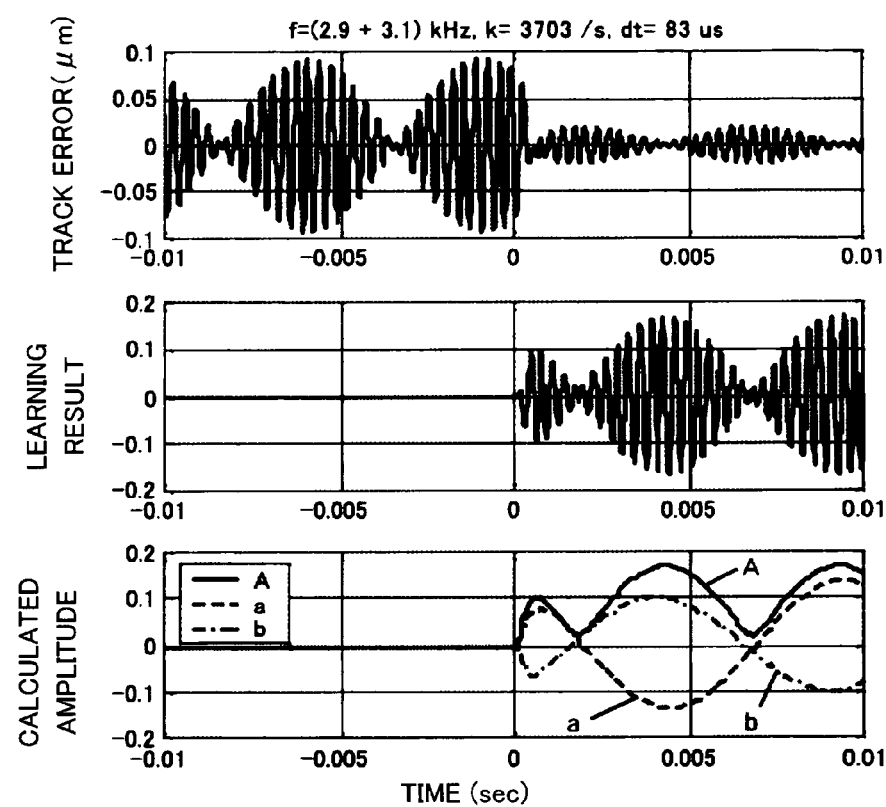
FIG. 18 is a diagram depicting the characteristics of the fifth embodiment of time lead compensation according to the present invention.

In the present invention, even a frequency disturbance which involves amplitude fluctuation, phase fluctuation and frequency fluctuation, can be compensated. FIG. 17 and FIG. 18 show examples. The sine wave signal learning section 82 of the present invention has a model of the sine wave signal inside, and the parameter values a (t) and b (t) thereof are adjusted by an adaptive control method, so even when the frequency of the target frequency disturbance is somewhat different from the model, or when the amplitude and the phase gradually change, the effect thereof can be implemented.

FIG. 17 shows the case when 2.9 kHz of frequency disturbance, which is slightly different from the frequency 3 kHz assumed in the model inside the sine wave signal learning section, is applied under the same conditions as FIG. 11. In this case as well, the influence of disturbance is quickly and effectively suppressed after learning, as the change of the tracking error in the diagram at the top shows. In this case, however, the disturbance cannot be suppressed completely since the frequency is different from the model.

In this case, where the disturbance frequency deviates from the model, the phase appears to change gradually from the view of the sine wave signal learning section 82. Therefore the fluctuations of the parameter values a(t) and b(t) in the diagram at the bottom do not converge into a predetermined value, but always fluctuate following the phase fluctuation.

The value A $(=\sqrt{(a^2+b^2)})$, which indicates the amplitude of the composite signal of the sine and cosine waveforms based on the formula (5-1), on the other hand, becomes a constant value. Since the parameters a (t) and b(t) are constantly updated by the adaptive control method in the present invention, the effect thereof can be implemented even when the phase of the frequency disturbance gradually shifts, just like the case when the disturbance frequency is different from that of the model.

FIG. 18 is the case when the amplitude also fluctuates. Here the sine waves, where the frequencies are 2.9 kHz and 3.1 kHz, are combined and applied as a disturbance. Therefore the disturbance has a waviness and the amplitudes and the phase thereof change. In such a case as well, this disturbance can be effectively suppressed, as shown in the track error amount in the diagram at the top, since the parameters a (t) and b (t) are constantly updated by the adaptive control method.

[Another Follow-Up Control System]

Figure 19:
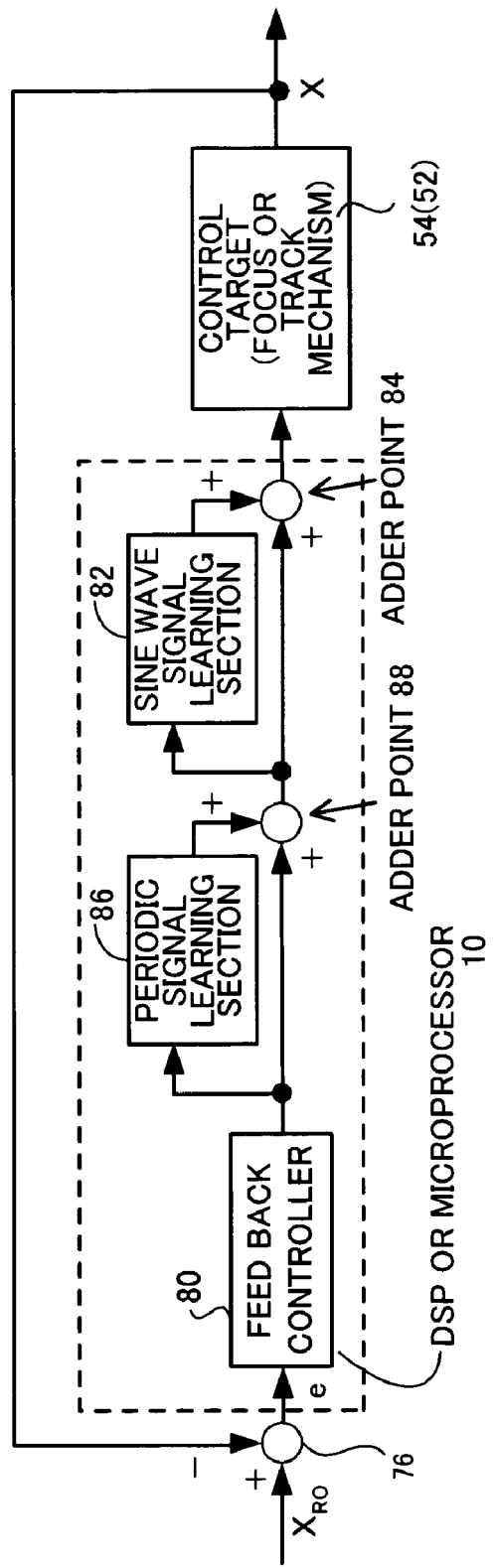
FIG. 19 is a block diagram depicting another embodiment of the follow-up control system according to the present invention.
Figure 20:
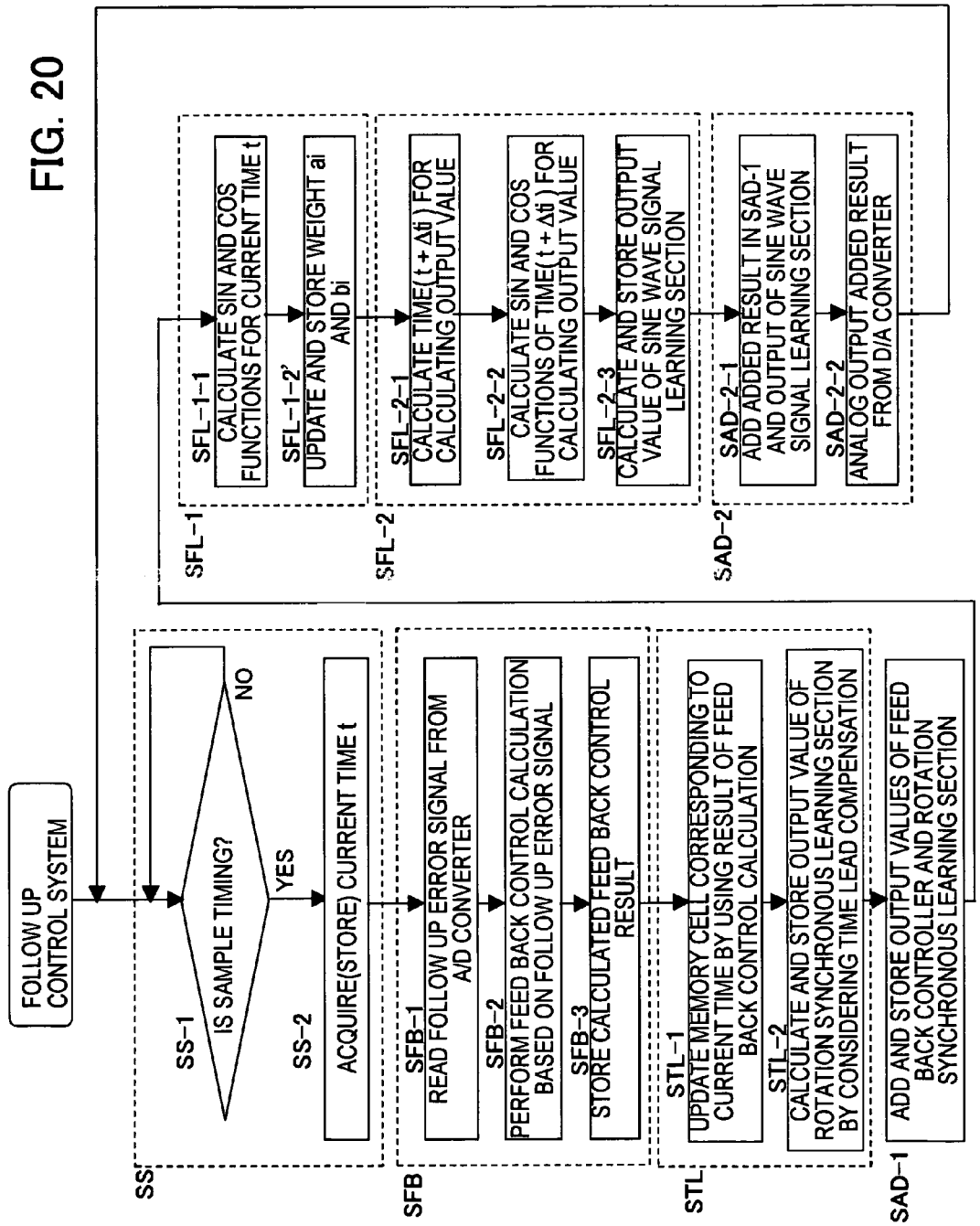
FIG. 20 is a flow chart depicting the follow-up control of FIG. 19.
Figure 21:
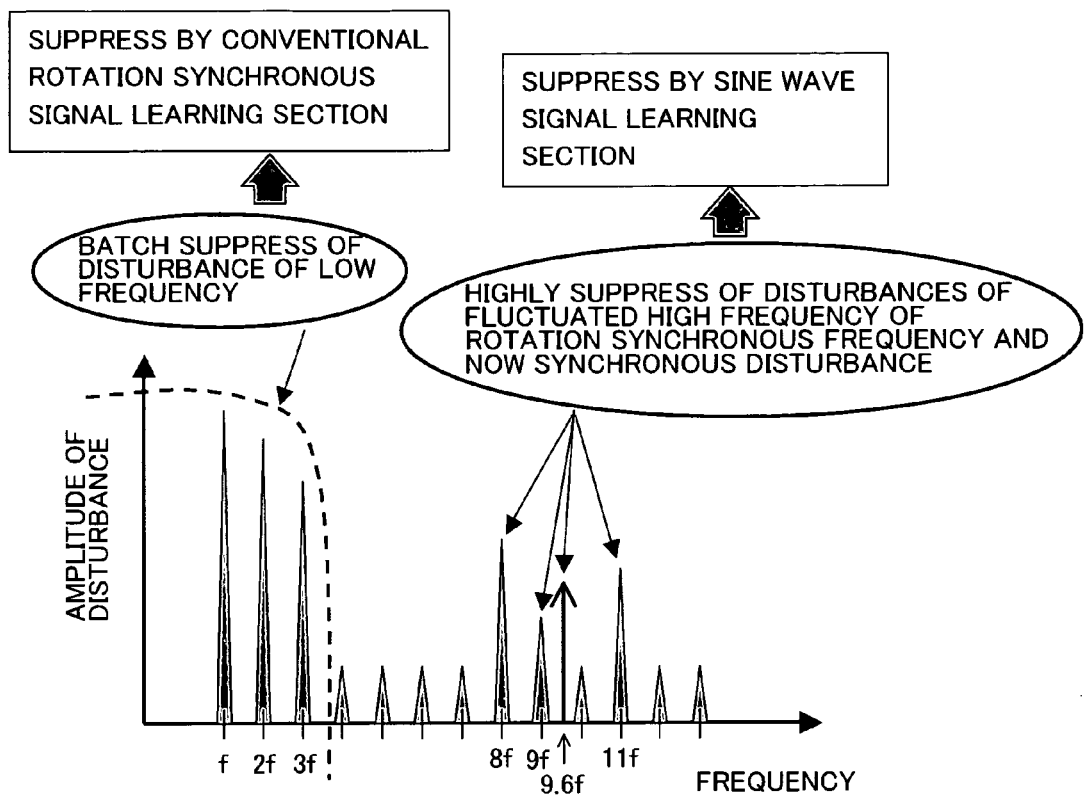
FIG. 21 is a diagram depicting the frequency suppression operation according to the embodiment in FIG. 19.
Figure 22:
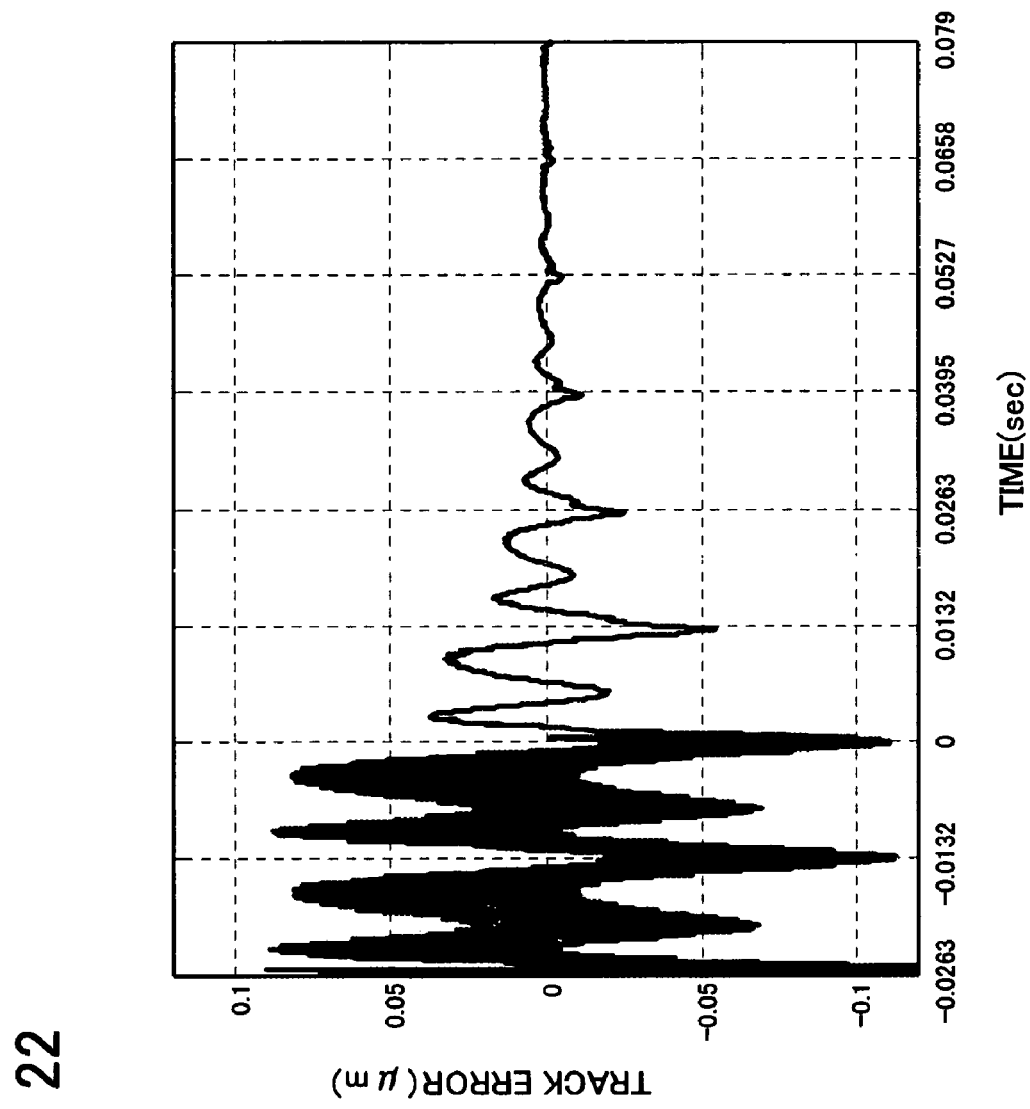
FIG. 22 is a diagram depicting the track error characteristics according to the embodiment in FIG. 19.
Figure 23:
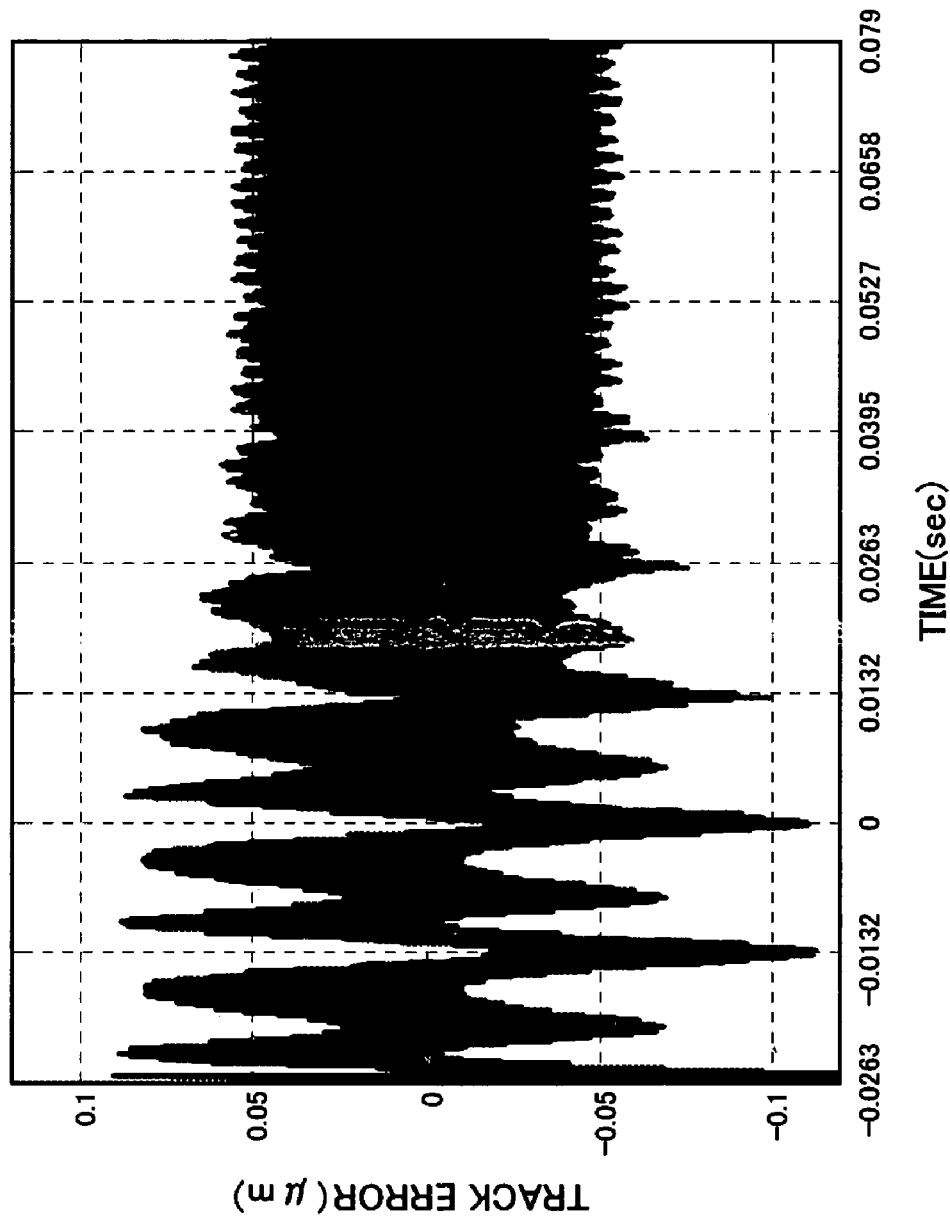
FIG. 23 is a diagram depicting the track error characteristics according to a comparison example.
Figure 24:
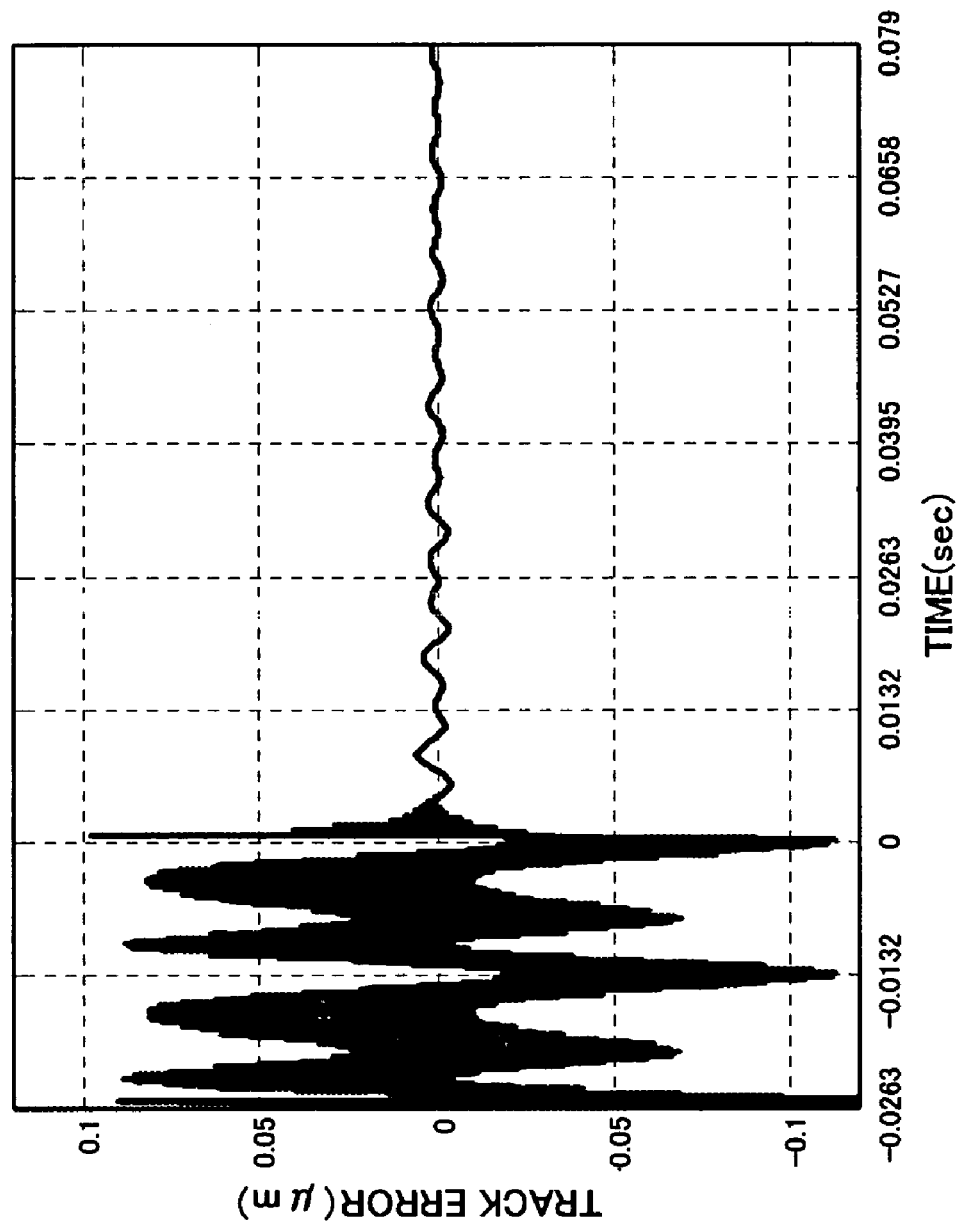
FIG. 24 is a diagram depicting the track error characteristics according to the embodiment in FIG. 4.

FIG. 19 is a block diagram of the follow-up control system of another embodiment of the present invention, FIG. 20 is a flow chart depicting the follow-up control thereof, FIG. 21 is a diagram depicting operation thereof, and FIG. 22 to FIG. 24 are diagrams depicting the simulation results thereof.

In FIG. 19, components identical with those in FIG. 4 are denoted with the same reference numerals, and a periodic signal learning section 86 and an addition section 88 are added between the feedback controller 80 and the sine wave signal learning section 82.

In the above description, the case when one or two frequency disturbances conspicuously influence the follow-up accuracy was described, but in the focus or track control of an actual disk device, a disturbance due to many frequency components combined is applied.

In the rotation system of a disk device, a disturbance amplitude of frequency components, which is an integral multiple of the rotation frequency, is normally conspicuous. For example, in the case of the conceptual diagram of a disturbance which has a plurality of frequency components in FIG. 9, 5 frequency components, f (rotation frequency), 2f, 3f, 8f and 11f are conspicuous. In some cases, a frequency disturbance not synchronizing rotation exists. For example, FIG. 9 shows the case when a frequency disturbance of frequency 9.6 f is conspicuous.

Such a disturbance not synchronizing rotation may be caused by the device itself, or may be a disturbance by vibration which enters from another device when another disk device with a different rotation frequency is combined.

In this case as well, the above mentioned sine wave signal learning section can be applied. Using the model shown in the formula (5), the sine wave model for each frequency is provided with n=7, and fd1=f, fd2=2f, fd3=3f, fd4=8f, fd5=9f, fd6=9.6f and fd7=11f, and a disturbance suppression control system, where a high-speed operation of the sine wave signal learning section is utilized, can be constructed using the learning rule of formula (6).

Also in the present invention, time lead compensation is used, so stable suppression control is possible even when the frequency component fdi, to be the target of suppression, includes a high frequency component close to the control band.

The sine wave signal learning section 82, on the other hand, has a shortcoming which is that the operation load is high since computation of the sin and cos-functions is included in the model. Therefore effectiveness is further improved when a DSP or microprocessor, which has high processing capabilities, is used.

Considering such an operation load, the configuration in FIG. 19 attempts a trade off of the operation load and the high-speed compensation performance by also using the conventional rotation synchronization signal learning section 86. For this rotation synchronization signal learning section 86, the configuration stated in the above mentioned Japanese Patent Application Laid-Open No. 2000-339729, and the description of Japanese Patent Application No. 2001-135470 can be used.

For example, the rotation synchronization learning method of these approaches is that the rotation period is divided into N, memory cells are provided corresponding to each 1/N period, and the rotation synchronization disturbance waveform is approximately represented and learned by sequentially updating each one of these values on line, and a waveform pattern is directly copied without having such a model as the sine wave model of the present invention.

This number N of divisions determines the frequency range of the waveform to be the learning target, and as N increases, a higher frequency disturbance can be learned, and if N is decreased, only a low frequency disturbance can be the learning target. The rotation synchronization signal learning section of the conventional proposal can be efficiently used with a low operation load for the suppression control of disturbance synchronizing rotation, including a plurality of frequency components synchronizing rotation (that is, including a plurality of frequency components which are an integral multiple of the rotation frequency).

In other words, the conventional rotation synchronization signal learning section is suitable for suppressing the frequency disturbance synchronization rotation due to a certain frequency or less in batch by designing N. The sine wave signal learning section of the present invention, on the other hand, has a merit in that the target disturbance can be suppressed at an extremely high-speed, although the operation load increases as the types of target frequencies increase.

Figure 28:
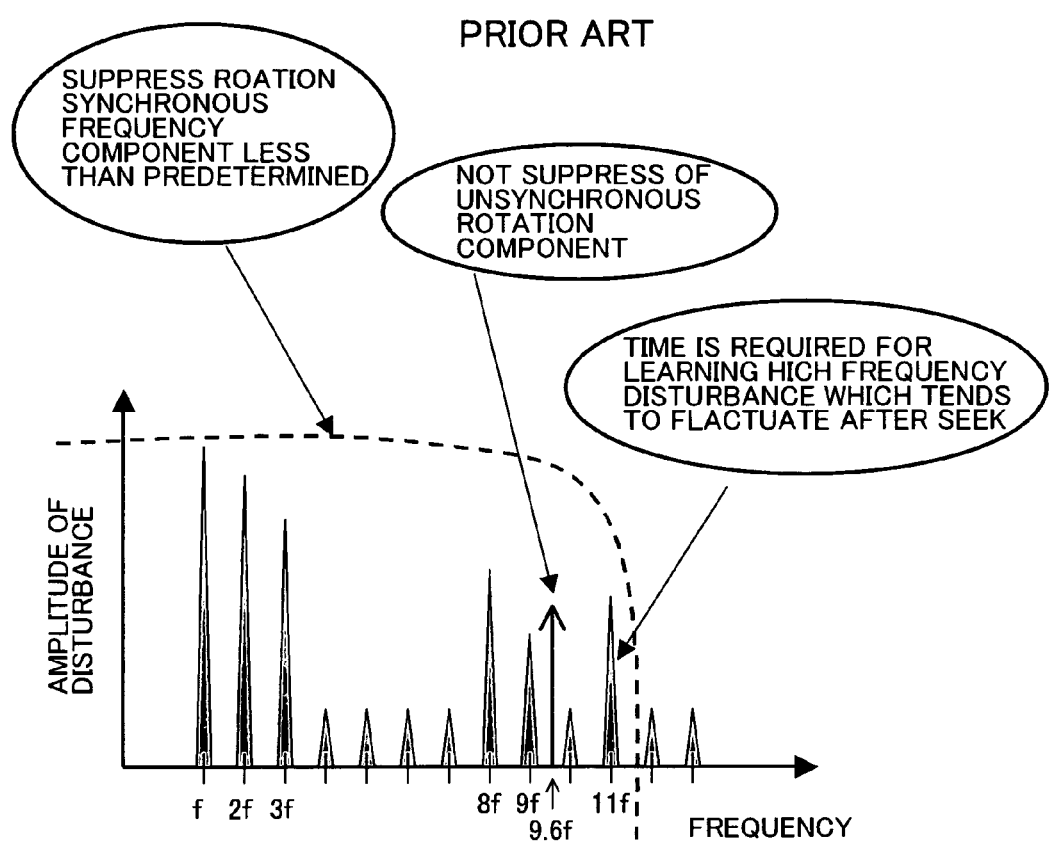
FIG. 28 is a diagram depicting the frequency disturbance suppression operation by a conventional sine wave signal learning section.

As described in the prior art in FIG. 28, if the disturbance is suppressed by the rotation synchronization signal learning means 86 in the conventional proposal when a frequency disturbance the same as FIG. 9 exists, a control system which can effectively suppress the 11f or less frequency disturbance synchronizing rotation, as shown in FIG. 28, can be constructed by selecting the number N of division appropriately. However in this case, no suppression effect can be implemented for a 9.6f frequency disturbance not synchronizing rotation.

Here the track follow-up of an optical disk is considered as an example. The conventional proposal discloses a method for individually providing the learning result of the rotation synchronization disturbance suppression signal for the respective radius position when the disturbance synchronizing rotation is slightly different between the inner side and the outer side of the disk. When the disturbance slightly differs depending on the radius position, it is often because high frequency components within the learning target frequency range differ. In other words, while low frequency components, which are generated by the eccentricity of the medium and the general waviness of the tracks of the medium, are relatively in common everywhere in the radius position, high frequency components differ in many cases depending on the radius position. As the high frequency of the waviness of tracks becomes more conspicuous, locality in the radius direction increases.

Therefore a very effective method is to suppress the components in the low frequency area, which do not change very much depending on the radius position, in batches using the rotation synchronization signal learning means 86 of the conventional proposal, and covering the high frequency components, which tend to differ depending on the position in the radius direction, by the sine wave signal learning means 82 of the present invention.

In other words, the high frequency components which tend to differ depending on the radius position can be quickly acquired and learned on each spot by the sine wave signal learning means 82 and be suppressed. If a frequency disturbance not synchronizing rotation exists at this time, that frequency can also be added as the compensation target of the sine wave signal learning means 82.

FIG. 21 is a diagram conceptually depicting such an example. As FIG. 21 shows, disturbance components in the low frequency area are suppressed in batch by the rotation synchronization signal learning means 86 in the conventional proposal. The high frequency components synchronizing rotation, which tend to differ depending on the radius position and the frequency components not synchronizing rotation, are covered by the sine wave signal learning means 82 of the present invention, and fluctuation is suppressed at high-speed. Covering low frequency components which do not change much, depending on the radius position, by the rotation synchronization signal learning means 86 in the conventional proposal also decreases the operation amount. Also by executing time lead compensation, which is a characteristic of the sine wave signal learning means 82 of the present invention, the disturbance can be compensated stably even with the high frequency components, which are close to the control band of the feedback control system, for example.

FIG. 19 is a diagram depicting a configuration example of the control system when the rotation synchronization signal learning means 86 in the conventional proposal and the sine wave signal learning means 82 are both used. The computing processing enclosed by the dotted line frame is implemented by a DSP or microprocessor 10. The follow-up error signal e is converted into a digital quantity by the A/D converter (not illustrated). The final operation result is output to the driver circuit of the control target actuator via the D/A converter (not illustrated). In the DSP 10, a series of processing in the dotted line frame are executed at a predetermined sampling period.

These processing will now be described using the flow chart of the processing program on the DSP in FIG. 20. In FIG. 20, there are many processing common with those shown in FIG. 10, so descriptions on the common processing are omitted here. The dotted line frames SS and SFB are processing common with those in FIG. 10.

In the dotted line frame STL, computing processing of the rotation synchronization signal learning section 86 is performed using the operation result of the feedback controller 80, which was calculated and stored in SFB-3. The rotation synchronization signal learning section 86 is designed such that the disturbance synchronizing rotation, due to a predetermined frequency or less, can be sufficiently suppressed, as shown in FIG. 21 by designing the number N of divisions appropriately. The internal processing of the rotation synchronization signal learning section 86 is a processing similar to that stated in the description of Japanese Patent Application No. 2001-135470, for example.

Briefly, in-STL-1, learning processing is performed by updating the memory cell value corresponding to the current time using the feedback controller output value, and in STL-2, output processing for computing the output value of the rotation synchronization signal learning section 86 is performed.

SAD-1 corresponds to the processing of the addition point 88 in FIG. 19, where the feedback controller output value, computed and stored in SFB-3, and the output value of the rotation synchronization signal learning section-86, computed and stored in STL-2, are added, and the addition result is stored.

The dotted line frames SFL-1 and SFL-2 are the sections where the processing of the sine wave signal learning section 82 is executed. Since the processing of these sections is similar to those in the sine wave signal learning section 82 described in FIG. 10, a detailed description is omitted. The difference is as a comparison of FIG. 4 and FIG. 19 shows, that the input value of the sine wave signal learning section 82 is the output value of the feedback controller 80 in FIG. 4, but the input value is the sum of the output-value of the feedback controller 80 and the output value of the rotation synchronization signal learning section 86 in FIG. 19. In other words, in SLF1-2 in FIG. 10, the formula (8) is calculated, but in SLF1-2 in FIG. 20, the formula (12) is calculated.

$$\begin{cases} a_i(N) = a_i(L) + k \cdot T_s \cdot \sin(2 \cdot \pi \cdot f_{di} \cdot t) \cdot (I_{FB}(t) + I_{rep}(t)) \\ b_i(N) = b_i(L) + k \cdot T_s \cdot \cos(2 \cdot \pi \cdot f_{di} \cdot t) \cdot (I_{FB}(t) + I_{rep}(t)) \end{cases} \quad (12)$$

for $1 \le i \le n$

Here Irep (t) is an output value of the rotation synchronization signal learning section 86. In other words, the value of ($I_{FB}$ (t)+Irep (t)) in the formula (12) is the value calculated and stored in SAD-1.

The dotted line frame SAD-2 is a processing corresponding to the addition point 84 in FIG. 19. In other words, the addition result in SAD-1 and the output value of the sine wave signal learning section 82 calculated in SFL-2-3 are added (SAD-2-1), and the addition result is output via the D/A converter (SAD-2-2).

Simulation was then conducted to show the effect of the embodiment in FIG. 19 and FIG. 20. It is assumed that the rotation frequency of the disk is 76 Hz, and that track follow-up control is used. The first to the third order of eccentricity components (that is, 76 Hz, 152 Hz and 228 Hz of frequency disturbance synchronizing rotation) and a 2930 Hz frequency disturbance not synchronizing rotation, as the high frequency disturbance, were applied. The track follow-up control system is a 2.5 kHz band, and a 2930 Hz disturbance is the high frequency disturbance exceeding that band.

FIG. 23 shows the simulation result using the rotation synchronization signal learning section of the conventional proposal (proposed in the description of Japanese Patent Application No. 2001-135470). Since the rotation frequency of the disk is 76 Hz, the rotation period is 0.0132 seconds. In FIG. 23, a grid line is drawn to each rotation period. The learning starts at time "0", and learning converges at about 2 to 3 rotations. Although the first to third order of frequency components synchronizing rotation are quickly suppressed by the rotation synchronization signal learning section, a 2930 Hz disturbance not synchronizing rotation remains without being suppressed.

FIG. 22 is a simulation example when the rotation synchronization signal learning section 86 and the sine wave signal learning section 82 shown in FIG. 19 are both used. The sine wave signal learning section 82 is designed so as to suppress the 2930 Hz frequency disturbance. In this example as well, the rotation synchronization signal learning section 86 suppresses the first to third order of frequency components synchronizing rotation at about 2–3 rotation periods. Also the sine wave signal learning section 82 suppresses the 2930 Hz high frequency disturbance not synchronizing rotation very quickly after learning started at time "0".

In other words, by using both the 2 learning means shown in FIG. 19, disturbance can be effectively suppressed. In this case, the high frequency disturbance is 2930 Hz and does not synchronize rotation, but this simulation result clearly shows that the high frequency disturbance synchronizing rotation can also be suppressed at an extremely high-speed by the sine wave signal learning section.

This is because all that is required of the sine wave signal learning section is to provide a sine wave model, having the compensation target frequency, to the sine wave signal learning means, regardless whether the compensation target frequency synchronizes rotation or not. In other words, this simulation result shows the effectiveness of the above mentioned method for covering suppression of a low frequency disturbance synchronizing rotation by the rotation synchronization signal learning means, and a high frequency. disturbance synchronizing rotation, which tends to fluctuate, and a frequency disturbance not synchronizing rotation are covered by the sine wave signal learning means. The system using both of these methods is in practical terms very effective, where a trade off of the operation load and the compensation performance is attempted.

FIG. 24 is a simulation example when compensation was performed only by the sine wave signal learning section 82 under the same disturbance conditions, with the configuration in FIG. 4. In this case, for the sine wave model in the sine wave signal learning section 82, the sine wave model of the first to third order frequency synchronizing rotation and the sine wave model of the 2930 Hz frequency are provided. In other words, acquiring the effect shown in FIG. 9 is attempted.

In this case, all frequency disturbances are suppressed at an extremely high-speed after learning started at time "0". When the processing capabilities of a DSP improves and the operation load is no longer a concern, extremely high-speed disturbance suppression can be expected by covering all frequency disturbances by the sine wave signal learning section.

[Other Embodiments]

A trigonometric function approximation method (implementation method for fixed point DSP, for example) will now be described with reference to FIG. 25 and FIG. 26 as another embodiment of the present invention.

In the above mentioned sine wave signal learning section 82, the trigonometric function must be computed. However, a fixed point DSP installed in a product normally has no function to calculate the trigonometric function. So in this embodiment, a trigonometric function approximated by a polynomial of degree n is used.

Figure 26:
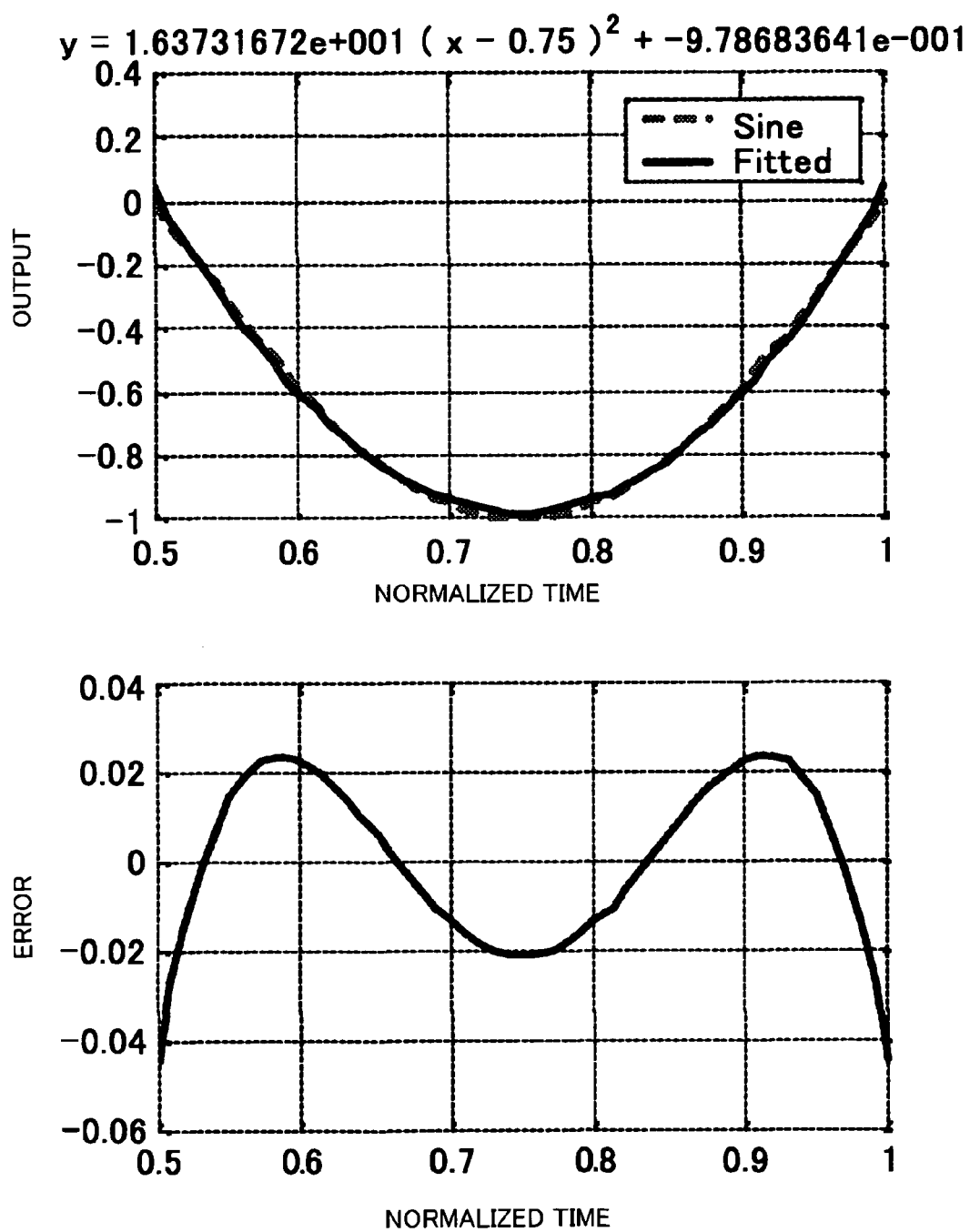
FIG. 26 is a diagram depicting the polynomial of degree two approximation of the trigonometric function and the approximation error according to another embodiment of the present invention (No. 2)

FIG. 25 and FIG. 26 show an example when a trigonometric function is approximated by a polynomial of degree 2. As shown here, the trigonometric function roughly has a parabolic characteristic if it is separated into a first half and a latter half of one period, therefore it can be approximated at sufficient accuracy. In this example, the period of the trigonometric function is normalized to "1". FIG. 25 shows the first half period, and FIG. 26 shows the latter half period, where the diagram at the top shows a comparison of the sin function and the approximation result, and the diagram at the bottom shows the approximation error (difference of the sine function and approximation result). When the amplitude of the sine wave is "1", approximation is performed with an error of about 4% or less.

In other words, the approximation of the sin function is given by the following formula (13).

$$f\sin(2\pi \cdot x) = \begin{cases} -16.3 \cdot (x-0.25)^2 + 0.98 & \text{if } 0 \le x < 0.5 \\ 16.3 \cdot (x-0.75)^2 - 0.98 & \text{if } 0.5 \le x < 1 \end{cases} \quad (13)$$

And the approximation of the cos function is given by the following formula (14), since this is a function with a ¼ period shifted.

$$f\cos(2\pi \cdot x) = \begin{cases} -16.3 \cdot x^2 + 0.98 & \text{if } 0 \le x < 0.25 \\ 16.3 \cdot (x-0.5)^2 - 0.98 & \text{if } 0.25 \le x < 0.75 \\ -16.3 \cdot (x-1.0)^2 + 0.98 & \text{if } 0.75 \le x < 1 \end{cases} \quad (14)$$

"x" to be substituted in the formula (13) and the formula (14) is determined by the following formula (15), where the target frequency of the sine wave is fd [Hz] and the target time is t.

$$x = fd \times t - \text{floor}(fd \times t) \quad (15)$$

Here, floor (u) is a function which returns a maximum integer which is smaller than or equal to the argument u.

In this way, a feed-forward is sequentially performed based on the identification result, so the disturbance can be compensated even if the amplitude and the phase of the target disturbance fluctuate. Also time lead compensation is used, so a frequency disturbance due to high frequency, for which phase lag must be considered, can be the compensation target. For example, a frequency disturbance, due to a frequency close to or exceeding the control band of the focus control system and the track control system, can be efficiently suppressed. The trigonometric function is approximately computed by a polynomial of degree n (e.g. degree 2), so the present invention can be easily applied even to a mass produced DSP.

The present invention was described using embodiments, but the present invention can be variously modified within the scope of the essential technical character, which shall not be excluded from the technical scope of the present invention.

INDUSTRIAL APPLICABILITY

Since time lead compensation is used for the sine wave signal learning model with which high-speed learning is possible, a frequency disturbance due to high frequency, for which phase lag must be considered, can be the compensation target. Therefore the present invention contributes to an improvement of the follow-up accuracy of the storage device.

Also as suffix i added to the time lead compensation $\Delta t_i$ shows, an individual time lead compensation amount can be set for each frequency when the learning result is output, so phase lag in the target control system, which is generated due to a characteristic of the feedback system, is accurately compensated by using the value $\Delta t_i$, which is optimized for each frequency. This compensation need not be accurately performed in a practical sense, so in many cases a typical value (e.g. mean value), and not the individual $\Delta t_i$ value, can be used. In such a case, the method of the present invention becomes a method with less calculation load than the conventional "Basic Function Algorithm." method, since compensation using a filter having the inverted characteristic $A(z^{-1})/B(z^{-1})$ is not performed.

Also according to the conventional method, delay compensation is the compensation in the sampling time unit, but the time lead-compensation $\Delta t_i$ of the present invention has a time unit, and can execute phase compensation with a resolution which is less than the sampling time. Therefore a highly accurate delay compensation can be performed without using a filter with the inverted characteristic $A(z^{-1})/B(z^{-1})$.

Also the lead amount can be individually set for a plurality of frequency disturbances, and the phase lead control can be implemented without deteriorating gain, as seen in the case of a phase lead filter.

The invention claimed is:

1. A head follow-up control method for following up a head to a storage medium, comprising:
    a feedback control step of calculating a feedback control amount for a follow-up control of said head based on a follow-up error signal of said head by using a feedback control system;
    a disturbance model update step of representing a disturbance model of frequency disturbance by weight composition of a sin function and a cos function, and sequentially updating the weights for said sin function and said cos function of said disturbance model by a learning rule of which input is a signal according to said follow-up error signal;
    a disturbance model value output step of outputting a disturbance model output value corresponding to a time lead by a time period for canceling a delay of said feedback control system to be the target; and
    a step of feeding said disturbance model output value to said feedback control system.

2. The head follow-up control method according to claim 1, wherein said feeding step comprises a step of adding said disturbance model output value to an input of said feedback control system.

3. The head follow-up control method according to claim 1, wherein said feeding step comprises a step of adding said disturbance model output value to an output of said feedback control system.

4. The head follow-up control method according to claim 1, wherein said feedback step comprises a step of calculating a feedback control amount for track follow-up control or focus follow-up control of said head based on the follow-up error signal for at least one of the track or focus position of said storage medium of said head.

5. The head follow-up control method according to claim 1, wherein said feedback step further comprises a step of setting the disturbance model of said frequency disturbance for a plurality of different frequencies.

6. The head follow-up control method according to claim 1, wherein said feedback step comprises a step of calculating a feedback control amount for the follow-up control of said head based on a follow-up error of said head for said storage medium that rotates, and
    said method further comprises a rotation synchronization signal learning step of learning a frequency component synchronizing rotation of said storage medium and feeding the frequency component to said feedback control system.

7. The head follow-up control method according to claim 1, wherein said disturbance model value output step comprises a step of outputting a disturbance model output value corresponding to the time lead by the time period for canceling the phase lag of said feedback control system.

8. The head follow-up control method according to claim 1, wherein said disturbance model update step comprises a step of updating said disturbance model using said sin and cos functions approximated by a polynomial of degree n.

9. A head follow-up control device for a head to follow up a storage medium, comprising:
    a feedback control system for calculating a follow-up control amount for said head based on a follow-up error signal of said head;
    a sine wave signal learning section for representing a disturbance model of frequency disturbance by weight composition of a sin function and a cos function, sequentially updating the weights for said sin function and said cos function of said disturbance model by a learning rule of which input is a signal according to said follow-up error signal, and outputting a disturbance model output value corresponding to a time lead by a time period for canceling a delay of said feedback control system; and
    addition means for feeding said disturbance model output value to said feedback control system.

10. The head follow-up control device according to claim 9, wherein said addition means adds said disturbance model output value to an input of said feedback control system.

11. The head follow-up control device according to claim 9, wherein said addition means adds said disturbance model output value to the output of said feedback control system.

12. The head follow-up control device according to claim 9, wherein said feedback system calculates a track follow-up control amount or focus follow-up control amount of said head based on a follow-up error signal for a track or focus position of said storage medium of said head.

13. The head follow-up control device according to claim 9, wherein said sine wave signal learning section sets the disturbance model of said frequency disturbance for a plurality of different-frequencies.

14. The head follow-up control device according to claim 9, wherein said feedback control system comprises a feedback system for calculating a follow-up control amount of said head based on a follow-up error of said head for said storage medium that rotates;
    and further comprises a rotation synchronization signal learning section for learning a frequency component synchronizing rotation of said storage medium and feeding the frequency component to said feedback system.

15. The head follow-up control device according to claim 9, wherein said sine wave signal learning section outputs a disturbance model output value corresponding to a time lead by a time period for canceling a phase lag of said feedback control system.

16. The head follow-up control device according to claim 9, wherein said sine wave signal learning section learns said disturbance model using said sin and cos functions approximated by a polynomial of degree n.

17. A storage device for at least reading data of a storage medium, comprising:
- a head for at least reading the data of said storage medium; and
- a head follow-up control section for the head to follow up said storage medium,
- wherein said head follow-up control section comprises:
  - a feedback control system for calculating a follow-up control amount of said head based on a follow-up error signal of said head;
  - a sine wave signal learning section for representing a disturbance model of frequency disturbance by weight composition of a sin function and a cos function, sequentially updating the weights for said sin function and said cos function of said disturbance model by a learning rule of which input is a signal according to said follow-up error signal, and outputting a disturbance model output value corresponding to a time lead by a time period for canceling a delay of said feedback control system; and
  - addition means for feeding said disturbance model output value to said feedback control system.

18. The storage device according to claim 17, wherein said addition means adds said disturbance model output value to an input of said feedback control system.

19. The storage device according to claim 17, wherein said addition means adds said disturbance model output value to an output of said feedback control system.

20. The storage device according to claim 17, wherein said feedback control system calculates a track follow-up control amount or focus follow-up control amount of said head based on a follow-up error signal for a track or focus position of said storage medium of said head.

21. The storage device according to claim 17, wherein said sine wave signal learning section sets the disturbance model of said frequency disturbance for a plurality of different frequencies.

22. The storage device according to claim 17, wherein said feedback control system comprises a feedback system for calculating a follow-up control amount of said head based on a follow-up error of said head for said rotating storage medium;

and further comprises a rotation synchronization signal learning section for learning a frequency component synchronizing rotation of said storage medium and feeding the frequency component to said feedback control system.

23. The storage device according to claim 17, wherein said sine wave signal learning section outputs a disturbance model output value corresponding to a time lead by a time period for canceling a phase lag of said feedback control system.

24. The storage device according to claim 17, wherein said sine wave signal learning section learns said disturbance model using said sin and cos functions approximated by a polynomial of degree n.

* * * * *